(12) United States Patent
Noda et al.

(10) Patent No.: US 12,007,540 B2
(45) Date of Patent: Jun. 11, 2024

(54) ZOOM LENS AND IMAGING APPARATUS

(71) Applicant: FUJIFILM Corporation, Tokyo (JP)

(72) Inventors: Taiga Noda, Saitama (JP); Ryosuke Nagami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 618 days.

(21) Appl. No.: 17/188,021

(22) Filed: Mar. 1, 2021

(65) Prior Publication Data
US 2021/0286156 A1 Sep. 16, 2021

(30) Foreign Application Priority Data

Mar. 11, 2020 (JP) ................................. 2020-042283

(51) Int. Cl.
G02B 15/14 (2006.01)
G02B 15/20 (2006.01)
G02B 27/00 (2006.01)

(52) U.S. Cl.
CPC ......... G02B 15/1461 (2019.08); G02B 15/20 (2013.01); G02B 27/0025 (2013.01)

(58) Field of Classification Search
CPC .............. G02B 15/1461; G02B 15/20; G02B 27/0025; G02B 15/08; G02B 15/145121; G02B 15/145125; G02B 15/16; G02B 13/0015; G02B 13/0045; G02B 13/006
See application file for complete search history.

(56) References Cited

U.S. PATENT DOCUMENTS

| | | | | |
|---|---|---|---|---|
| 2013/0342716 | A1* | 12/2013 | Yamamoto | G02B 27/646 359/557 |
| 2015/0085153 | A1 | 3/2015 | Souma | |
| 2016/0091697 | A1* | 3/2016 | Ikeda | G02B 15/173 359/683 |
| 2019/0278068 | A1* | 9/2019 | Hatada | G02B 15/1461 |

(Continued)

FOREIGN PATENT DOCUMENTS

| | | |
|---|---|---|
| JP | 2009-217167 A | 9/2009 |
| JP | 2014-098794 A | 5/2014 |
| JP | 2014-209226 A | 11/2014 |

(Continued)

OTHER PUBLICATIONS

An Office Action; "Notice of Reasons for Refusal," mailed by the Japanese Patent Office dated Jan. 10, 2023, which corresponds to Japanese Patent Application No. 2020-042283 and is related to U.S. Appl. No. 17/188,021; with English language translation.

(Continued)

*Primary Examiner* — Alicia M Harrington
(74) *Attorney, Agent, or Firm* — Studebaker & Brackett PC

(57) ABSTRACT

A zoom lens consists of, in order from an object side to an image side: a first lens group having a positive refractive power; a second lens group having a negative refractive power; a third lens group having a positive refractive power; a fourth lens group having a positive refractive power; a fifth lens group having a negative refractive power; and a sixth lens group having a positive refractive power. During zooming from the wide angle end to the telephoto end, the distance between the adjacent lens groups in the optical axis direction changes, and the third lens group and the fifth lens group move integrally along the optical axis.

19 Claims, 15 Drawing Sheets

EXAMPLE 1

(56) References Cited

U.S. PATENT DOCUMENTS

2019/0361212 A1* 11/2019 Machida ............... G02B 15/20

FOREIGN PATENT DOCUMENTS

| JP | 2015-064491 A | 4/2015 |
| JP | 2015-069040 A | 4/2015 |
| JP | 6208458 B2 | 10/2017 |
| JP | 2019-028212 A | 2/2019 |
| JP | 2019-113763 A | 7/2019 |

OTHER PUBLICATIONS

An Office Action; "Notice of Reasons for Refusal," mailed by the Japanese Patent Office dated Oct. 18, 2022, which corresponds to Japanese Patent Application No. 2020-042283 and is related to U.S. Appl. No. 17/188,021; with English language translation.

* cited by examiner

EXAMPLE 1

EXAMPLE 2

EXAMPLE 3

EXAMPLE 5

EXAMPLE 6

ZOOM LENS AND IMAGING APPARATUS

CROSS-REFERENCE TO RELATED APPLICATIONS

The present application claims priority under 35 U.S.C. § 119 to Japanese Patent Application No. 2020-042283, filed on Mar. 11, 2020. The above application is hereby expressly incorporated by reference, in its entirety, into the present application.

BACKGROUND OF THE INVENTION

1. Field of the Invention

The technology of the present disclosure relates to a zoom lens and an imaging apparatus.

2. Description of the Related Art

As a zoom lens applicable to an imaging apparatus such as a digital camera and a video camera, lens systems described in JP2019-028212A and Japanese Patent No. 6208458 are known.

SUMMARY OF THE INVENTION

In recent years, there has been a demand for achieving reduction in size of the imaging apparatus. Above all, there is a strong demand for achieving reduction in size of an imaging lens in the imaging apparatus such as a mirrorless camera having a small camera body. Under such circumstances, for example, even in a telephoto type lens system in which the total lens length tends to be long and large, it is an important matter how small the lens system can be. On the other hand, with the increase in number of pixels of the imaging element in recent years, there is a demand for a lens system in which aberrations are corrected with higher accuracy.

The present disclosure has been made in view of the above circumstances, and an object of the present disclosure is to provide a zoom lens, which has favorable optical performance and is advantageous for achieving reduction in size, and an imaging apparatus comprising the zoom lens.

A zoom lens according to an aspect of the present disclosure consists of, in order from an object side to an image side: a first lens group having a positive refractive power; a second lens group having a negative refractive power; a third lens group having a positive refractive power; a fourth lens group having a positive refractive power; a fifth lens group having a negative refractive power; and a sixth lens group having a positive refractive power. During zooming from a wide angle end to a telephoto end, the third lens group and the fifth lens group move integrally along an optical axis and distances between adjacent lens groups in an optical axis direction change.

It is preferable that the fourth lens group moves during focusing.

Assuming that a focal length of the third lens group is f3 and a focal length of the fourth lens group is f4, it is preferable that the zoom lens according to the aspect of the present disclosure satisfies Conditional Expression (1).

$$0.12 < f3/f4 < 1.24 \tag{1}$$

Assuming that a focal length of the second lens group is f2 and a focal length of the fourth lens group is f4, it is preferable that the zoom lens according to the aspect of the present disclosure satisfies Conditional Expression (2).

$$-1 < f2/f4 < -0.12 \tag{2}$$

Assuming that a focal length of the second lens group is f2 and a focal length of the first lens group is f1, it is preferable that the zoom lens according to the aspect of the present disclosure satisfies Conditional Expression (3).

$$-0.3 < f2/f1 < -0.07 \tag{3}$$

Assuming that a focal length of the fifth lens group is f5 and a focal length of the fourth lens group is f4, it is preferable that the zoom lens according to the aspect of the present disclosure satisfies Conditional Expression (4).

$$-0.79 < f5/f4 < -0.1 \tag{4}$$

Assuming that a focal length of the sixth lens group is f6 and a focal length of the first lens group is f1, it is preferable that the zoom lens according to the aspect of the present disclosure satisfies Conditional Expression (5).

$$0.25 < f6/f1 < 1 \tag{5}$$

Assuming that a distance on the optical axis from a lens surface closest to the object side in the first lens group to an image plane at the telephoto end is Xt1, a distance on the optical axis from the lens surface closest to the object side in the first lens group to the image plane at the wide angle end is Xw1, a distance on the optical axis from a lens surface closest to the object side in the second lens group to the image plane at the telephoto end is Xt2, a distance on the optical axis from the lens surface closest to the object side in the second lens group to the image plane at the wide angle end is Xw2, and a focal length of the first lens group is f1, it is preferable that the zoom lens according to the aspect of the present disclosure satisfies Conditional Expression (6).

$$0.35 < \{(Xt1-Xw1)-(Xt2-Xw2)\}/f1 < 0.55 \tag{6}$$

Assuming that a distance on the optical axis from a lens surface closest to the image side in the third lens group to a lens surface closest to the object side in the fifth lens group is Db35, and a focal length of the fourth lens group is f4, it is preferable that the zoom lens according to the aspect of the present disclosure satisfies Conditional Expression (7).

$$0.11 < Db35/f4 < 0.96 \tag{7}$$

Assuming that a distance on the optical axis from a lens surface closest to the object side in the third lens group to a lens surface closest to the image side in the fifth lens group is D3f5r, and a distance on the optical axis from a lens surface closest to the object side in the fourth lens group to a lens surface closest to the image side in the fourth lens group is T4, it is preferable that the zoom lens according to the aspect of the present disclosure satisfies Conditional Expression (8).

$$3.06 < D3f5r/T4 < 12.74 \tag{8}$$

It is preferable that the third lens group includes a positive lens closest to the object side. Assuming that a focal length of the positive lens closest to the object side in the third lens group is f31, and a focal length of the third lens group is f3, it is preferable that the zoom lens according to the aspect of the present disclosure satisfies Conditional Expression (9).

$$0.5 < f31/f3 < 2.8 \tag{9}$$

It is preferable that the third lens group includes a positive lens closest to the object side. Assuming that an Abbe number of the positive lens closest to the object side in the third lens group based on a d line is ν31, it is preferable that the zoom lens according to the aspect of the present disclosure satisfies Conditional Expression (10).

$$45 < \nu 31 < 97 \tag{10}$$

It is preferable that the first lens group consists of, in order from the object side to the image side, one negative lens and two positive lenses. Assuming that an average value of Abbe numbers of the two positive lenses of the first lens group based on a d line is ν1pave, it is preferable that the zoom lens according to the aspect of the present disclosure satisfies Conditional Expression (11).

$$60 < \nu 1 pave < 97 \tag{11}$$

It is preferable that the third lens group consists of, in order from the object side to the image side, one single lens having a positive refractive power, and a cemented lens in which one negative lens and one positive lens are cemented in order from the object side.

It is preferable that the fourth lens group includes a cemented lens in which one negative lens and one positive lens are cemented in order from the object side.

It is preferable that the fifth lens group consists of two negative lenses and one positive lens.

It is preferable that the sixth lens group consists of a single lens having a positive refractive power.

It is preferable that all lens surfaces of the sixth lens group have a shape convex toward the image side.

It is preferable that during zooming from the wide angle end to the telephoto end, the first lens group, the second lens group, the third lens group, the fourth lens group, and the fifth lens group move along the optical axis, and the sixth lens group remains stationary with respect to the image plane.

The imaging apparatus according another aspect of the present disclosure comprises the zoom lens according to the aspect of the present disclosure.

In the present specification, it should be noted that the terms "consisting of ~" and "consists of ~" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "— group having a positive refractive power" means that the group has a positive refractive power as a whole. Similarly, the term "— group having a negative refractive power" means that the group has a negative refractive power as a whole. The terms "a lens having a positive refractive power", "a positive lens", and "a lens with a positive power" are synonymous. The terms "a lens having a negative refractive power", "a negative lens", and "a lens with a negative power" are synonymous. The term "— lens group" is not limited to a configuration consisting of a plurality of lenses, but may consist of only one lens. The term "single lens" means one uncemented lens.

A compound aspheric lens (a lens in which a spherical lens and an aspheric film formed on the spherical lens are integrally formed and function as one aspheric lens as a whole) is not regarded as cemented lenses, but the compound aspheric lens is regarded as one lens. Unless otherwise specified, the sign of the refractive power and the surface shape of a lens including an aspheric surface are considered in terms of the paraxial region.

The "focal length" used in a conditional expression is a paraxial focal length. The values used in Conditional Expressions are based on the d line except for the partial dispersion ratio in a state where the object at infinity is in focus. The "d line", "C line", "F line", and "g line" described in this specification are emission lines. In this specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the aspects of the present disclosure, it is possible to provide a zoom lens, which has favorable optical performance and is advantageous for achieving reduction in size, and an imaging apparatus comprising the zoom lens.

DESCRIPTION OF THE PREFERRED EMBODIMENTS

Figure 1:
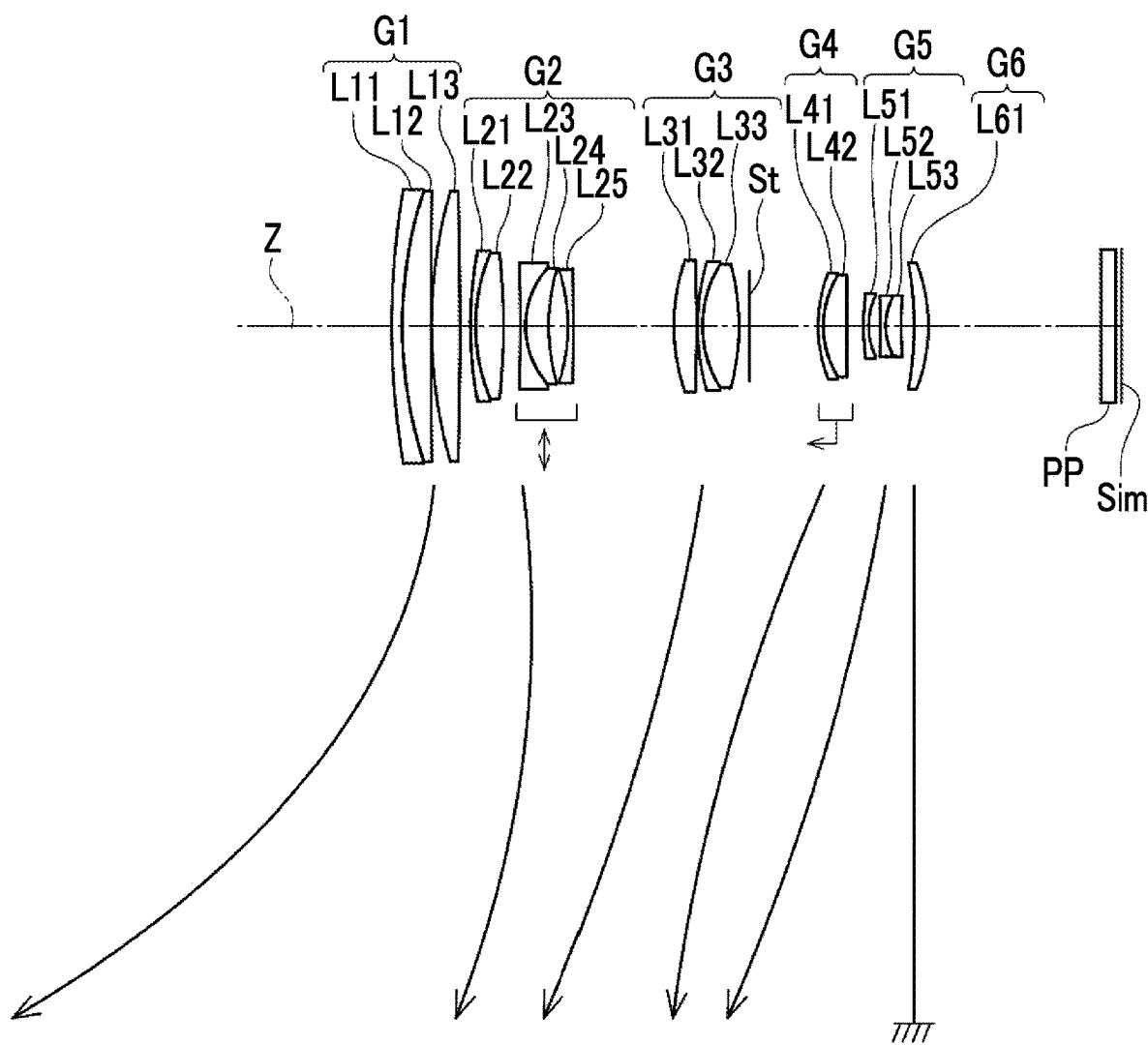
FIG. 1 is a cross-sectional view showing a configuration of a zoom lens according to an embodiment and a diagram showing movement loci thereof, the zoom lens corresponding to a zoom lens of Example 1.
Figure 2:
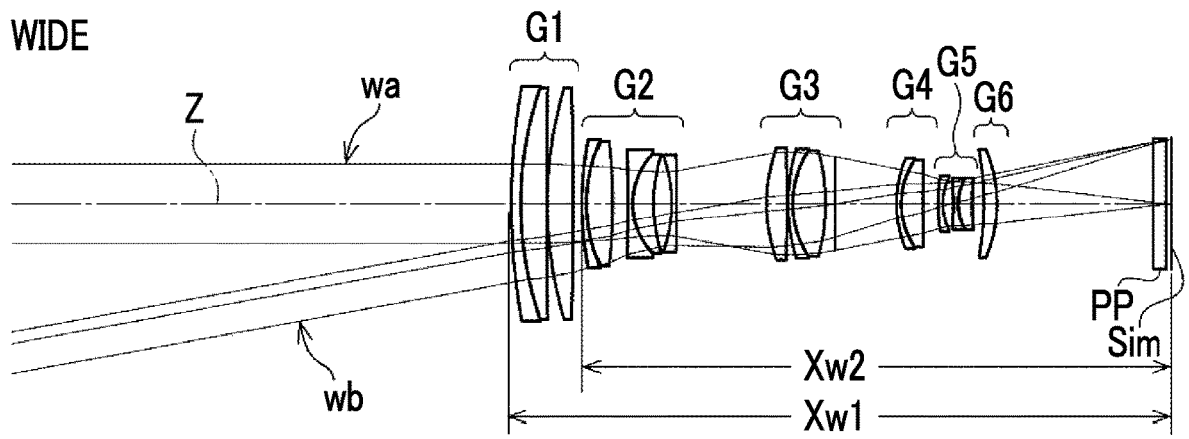
FIG. 2 is a cross-sectional view showing a configuration and rays in each zooming state of the zoom lens of FIG. 1.
Figure 2:
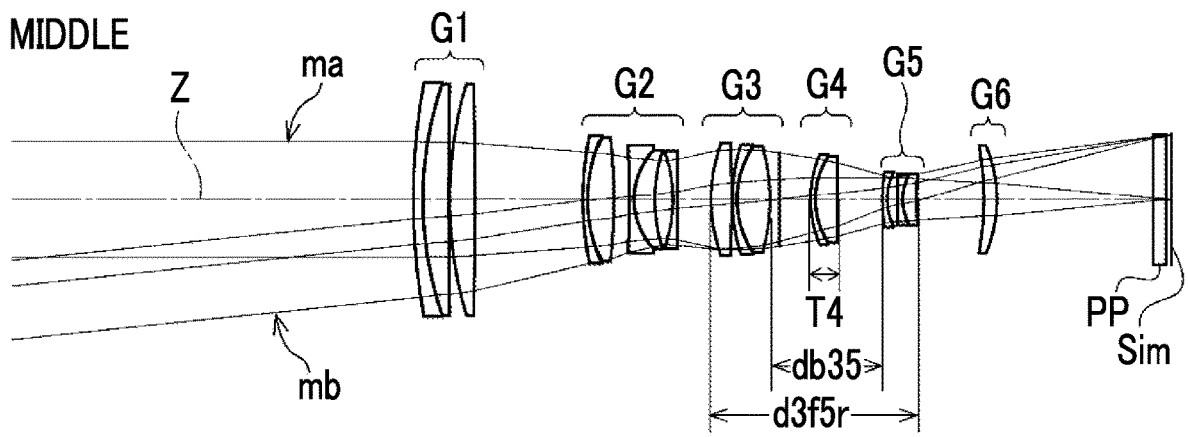
Figure 2:
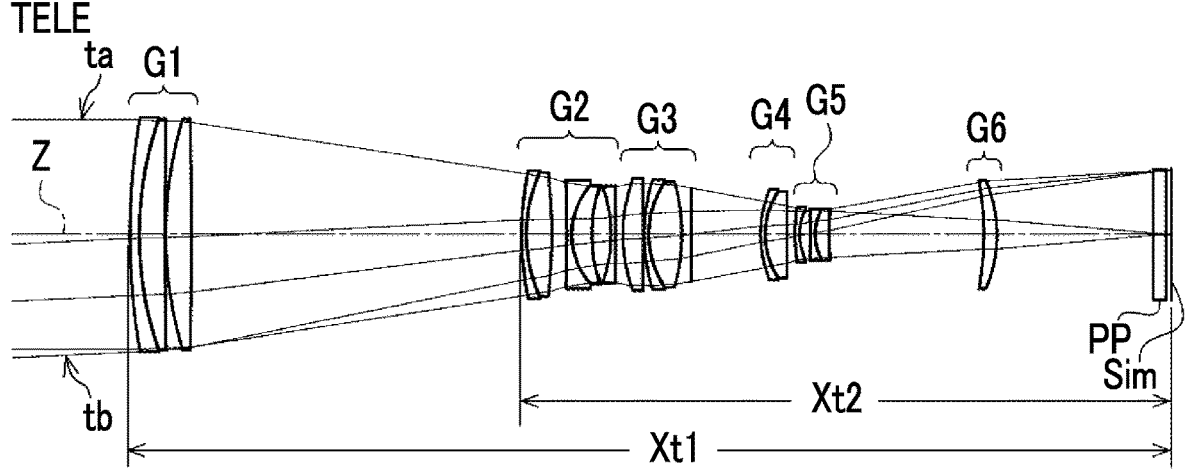

Hereinafter, embodiments of the present disclosure will be described in detail with reference to the accompanying drawings. FIG. 1 shows a cross-sectional view of a configuration and movement loci of a zoom lens according to an embodiment of the present disclosure at a wide angle end. FIG. 2 shows a cross-sectional view of the configuration and rays of this zoom lens in each zooming state. The examples shown in FIGS. 1 and 2 correspond to a zoom lens of Example 1 described later. FIGS. 1 and 2 show situations where an object at infinity is in focus, the left side thereof is an object side, and the right side thereof is an image side. In FIG. 2, the upper part labeled by "WIDE" shows the wide angle end state, the middle part labeled by "MIDDLE" shows the middle focal length state, and the lower part labeled by "TELE" shows the telephoto end state. FIG. 2 shows rays including on-axis rays wa and rays with the maximum angle of view wb at the wide angle end state, on-axis rays ma and rays with the maximum angle of view mb at the middle focal length state, and on-axis rays to and rays with the maximum angle of view tb at the telephoto end state. Hereinafter, the zoom lens according to the embodiment of the present disclosure will be described mainly with reference to FIG. 1. Further, hereinafter, the "zoom lens of the present disclosure" is also simply referred to as "zoom lens".

FIG. 1 shows an example in which, assuming that a zoom lens is applied to an imaging apparatus, an optical member PP having a parallel plate shape is disposed between the zoom lens and the image plane Sim. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The zoom lens of FIG. 1 consists of, in order from the object side to the image side along the optical axis Z, a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power. Further, during zooming from the wide angle end to the telephoto end, the distance between the adjacent lens groups in the optical axis direction changes. The above configuration is advantageous for achieving reduction in total lens length. More specifically, the above-described configuration makes it easy to reduce the amount of movement of the lens group during zooming. Therefore, there is an advantage in achieving reduction in total lens length and reducing the amount of extension of the first lens group G1 during zooming from the wide angle end to the telephoto end. In particular, in a case where this zoom lens is applied to a mirrorless camera having a short back focal length, effects more advantageous than the above effects can be obtained.

In FIG. 1, regarding the lens groups that move during zooming, a schematic movement locus during zooming from the wide angle end to the telephoto end is shown below each lens group by a curved arrow, and a ground symbol is shown for the lens group that remains stationary during zooming. In the example of FIG. 1, during zooming from the wide angle end to the telephoto end, the first lens group G1, the second lens group G2, the third lens group G3, the fourth lens group G4, and the fifth lens group G5 move along the optical axis Z. By moving the five lens groups from the first lens group G1 to the fifth lens group G5 during zooming, each lens group can share the zooming action. Therefore, it is possible to prevent an amount of movement of each lens group during zooming from becoming excessively large. As a result, there is an advantage in achieving reduction in size.

The sixth lens group G6 in the example of FIG. 1 remains stationary with respect to the image plane Sim during zooming from the wide angle end to the telephoto end. By adopting a configuration including the lens group that remains stationary during zooming, it is possible to simplify the moving mechanism for zooming as compared with a configuration in which all lens groups move during zooming. Compared to other lens groups, the configuration, in which the sixth lens group G6 is the lens group that remains stationary during zooming, is relatively simple in terms of lens design. Therefore, the configuration of the example in FIG. 1 is advantageous for simplifying and designing a moving mechanism. In addition, there are many members such as a communication contact with the camera body and a mount mechanism to be provided and arranged near the sixth lens group G6 which is the lens group closest to the image side. Therefore, the sixth lens group G6 remains stationary during zooming, and the moving mechanism for the sixth lens group G6 is not necessary. As a result, this configuration is advantageous for achieving reduction in size.

In this zoom lens, the third lens group G3 and the fifth lens group G5 move along the same movement loci during zooming from the wide angle end to the telephoto end. That is, during zooming from the wide angle end to the telephoto end, the third lens group G3 and the fifth lens group G5 move integrally along the optical axis Z. Here, the phrase "move integrally" means to move by the same amount in the same direction at the same time. In this zoom lens, the distance between the third lens group G3 and the fifth lens group G5 in the optical axis direction is constant over the entire zoom range. According to such a configuration, there is an advantageous in simplifying the moving mechanism of each lens group during zooming. For example, in a case where a cam is used to move the lens groups, the third lens group G3 and the fifth lens group G5 may move integrally during zooming. In this case, since only one cam groove is necessary to move the two lens groups including the third lens group G3 and the fifth lens group G5, there is an advantage in achieving reduction in size.

During focusing, it is preferable that the fourth lens group G4 located between the third lens group G3 and the fifth lens group G5 moves. Hereinafter, the lens group that moves during focusing is referred to as a focusing lens group. Normally, the focusing lens group is moved by driving the motor. Therefore, in a case where the fourth lens group G4 is used as the focusing lens group, the fourth lens group G4 is moved by driving the motor during focusing. Thus, even during zooming, the fourth lens group G4 can be configured to move by driving the motor. In this zoom lens, since the third lens group G3 and the fifth lens group G5 move on the same loci, the fourth lens group G4 is moved by driving the motor. Thereby, the third lens group G3, the fourth lens group G4, and the fifth lens group G5 can be integrally moved by using the cam. In that case, since only one cam groove is necessary to move these three lens groups, the cam mechanism can be greatly simplified. In such a manner, focusing is performed by moving the lens group (fourth lens group G4) located between the two lens groups (third lens group G3 and fifth lens group G5) that move integrally during zooming. Thereby, the moving mechanism of the lens group can be greatly simplified. As a result, there is an advantage in achieving reduction in size.

Further, since the fourth lens group G4 is adjacent to the image side of the third lens group G3 having a positive refractive power, the diameter of the focusing lens group can be reduced by making the fourth lens group G4 a focusing lens group. Thereby, it is easy to achieve reduction in weight of the focusing lens group. As a result, there is an advantage in high-speed focusing. The focusing lens group in the example of FIG. 1 consists of the fourth lens group G4. A parenthesis and a horizontal leftward arrow noted below the fourth lens group G4 in FIG. 1 indicate that the fourth lens group G4 is a focusing lens group and moves to the object side during focusing from the object at infinity to the closest object.

In the example of FIG. 1, during zooming, the sixth lens group G6 remains stationary, and the first lens group G1 to the fifth lens group G5 move. Among the lens groups, the third lens group G3 and the fifth lens group G5 integrally move, and during focusing, only the fourth lens group G4 moves. According to this configuration, the cam grooves necessary to move the lens groups can be only three cam grooves for the first lens group G1, for the second lens group G2, and for the lens groups from the third lens group G3 to the fifth lens group G5. Therefore, the cam mechanism can be greatly simplified even though the zoom lens has a six-group configuration.

In a zoom lens having a six-group configuration, in a case where the movement loci of the two lens groups are made to be the same during zooming, it is suitable that the movement loci of the third lens group G3 and the fifth lens group G5 are set to be the same as in the example of FIG. 1. Unlike the zoom lens shown in FIG. 1, in a case where the fourth lens group G4 and the sixth lens group G6 have the same movement loci, in order to use only three cam grooves necessary therefor, one of the lens groups from the first lens group G1 to the third lens group G3 may be made to be immovable during zooming. In this case, the degree of design difficulty becomes higher than the configuration in which the sixth lens group G6 is immovable during zooming. Alternatively, in a case where the movement loci of the fourth lens group G4 and the sixth lens group G6 are the same, the first lens group G1, the second lens group G2, and the third lens group G3 move during zooming. With such a configuration, four cam grooves are necessary.

Next, the configuration of each lens group will be described. The first lens group G1 has a positive refractive power as a whole. By forming the lens group closest to the object side as a lens group having a positive refractive power, there is an advantage in achieving reduction in total lens length.

It is preferable that the first lens group G1 consists of, in order from the object side to the image side, three lenses including one negative lens and two positive lenses. In a case where the first lens group G1 consists of the three lenses described above, there is an advantage in correcting longitudinal chromatic aberration, lateral chromatic aberration, and spherical aberration. By using two positive lenses in the first lens group G1, there is an advantage in ensuring the positive refractive power of the first lens group G1 while suppressing occurrence of spherical aberration and achieving reduction in total lens length.

In addition, it is preferable that the first lens group G1 includes a cemented lens configured by cementing one negative lens and one positive lens. In such a case, there is an advantage in correcting longitudinal chromatic aberration at the telephoto end. In particular, in a case where the first lens group G1 includes the cemented lens closest to the object side, there is another advantage in correcting longitudinal chromatic aberration at the telephoto end.

As an example, the first lens group G1 in FIG. 1 consists of three lenses, a negative lens L11, a positive lens L12, and a positive lens L13, in order from the object side to the image side, where the lens L11 and the lens L12 are cemented to each other. The lens L11 is a negative meniscus lens having a surface convex toward the object side. The lens L12 is a positive lens having a surface convex toward the object side. The lens L13 is a positive lens having a surface convex toward the object side.

The second lens group G2 has a negative refractive power as a whole. The second lens group G2 having a negative refractive power is able to have a main function of zooming.

It is preferable that the second lens group G2 includes, in order from the object side to the image side, a cemented lens in which one negative lens and one positive lens are cemented in order from the object side, and a single lens having a negative refractive power. In such a case, by using the cemented lens, it is possible to suppress fluctuations in longitudinal chromatic aberration and lateral chromatic aberration during zooming. Further, the single lens is able to share the negative refractive power with the negative lens in the cemented lens, and is able to suppress spherical aberration, astigmatism, and distortion.

As an example, the second lens group G2 in FIG. 1 consists of five lenses, a negative lens L21, a positive lens L22, a negative lens L23, a positive lens L24, and a negative lens L25, in order from the object side to the image side. The lens L21 and the lens L22 are cemented to each other, and the lens L23 and the lens L24 are cemented to each other. The lens L21 is a negative meniscus lens having a surface convex toward the object side. The lens L12 is a biconvex lens. The lens L13 is a biconcave lens. The lens L14 is a positive meniscus lens having a surface convex toward the object side. The lens L15 is a negative lens having a surface concave toward the object side.

A part of the lenses of the second lens group G2 may be configured to move in a direction intersecting the optical axis Z during image stabilization. The term "image stabilization" here refers to image blur correction. Hereinafter, a group consisting of lenses, which move in a direction intersecting the optical axis Z during image stabilization, is referred to as an image stabilization lens group. In the example of FIG. 1, the image stabilization lens group consists of three lenses including the first, second, and third lenses from the image side of the second lens group G2, that is, the lenses L23, L24, and L25. By performing image stabilization at this position, it is suitable to ensure the sensitivity of image stabilization, and the amount of movement of the image stabilization lens group can be reduced. As a result, there is an advantage in achieving reduction in size. In addition, there is an advantage in suppressing fluctuation in aberration during image stabilization. A parenthesis and a vertical double-headed arrow noted below the three lenses in FIG. 1 indicate that the image stabilization lens group consists of these three lenses.

The third lens group G3 has a positive refractive power as a whole. The third lens group G3 having a positive refractive power can have a main positive refracting action of the entire system.

It is preferable that the third lens group G3 includes a positive lens closest to the object side. In such a case, the divergent light from the second lens group G2 is received by the positive lens closest to the object side in the third lens group G3. Therefore, the lens closer to the image side than the positive lens can be prevented from having a large diameter. As a result, there is an advantage in suppressing occurrence of spherical aberration.

It is preferable that the third lens group G3 consists of, in order from the object side to the image side, one single lens having a positive refractive power, and a cemented lens configured by cementing one negative lens and one positive lens in order from the object side. In such a case, it is easy to reduce the diameters of the third lens group G3 and the lens group closer to the image side than the third lens group G3, and it is easy to suppress occurrence of spherical aberration and longitudinal chromatic aberration. More specifically, the divergent light from the second lens group G2 is gently converted into convergent light by the two positive lenses consisting of the single lens having a positive refractive power and the positive lens in the cemented lens. Thereby, it is easy to suppress occurrence of spherical aberration while preventing a lens group closer to the image side than the third lens group G3 from increasing in diameter. In addition, the above-mentioned cemented lens is able to correct color bleeding due to longitudinal chromatic aberration.

As an example, the third lens group G3 in FIG. 1 consists of, in order from the object side to the image side, three lenses, a positive lens L31, a negative lens L32, and a positive lens L33, and an aperture stop St. The lens L32 and the lens L33 are cemented to each other. The lens L31 is a positive lens having a surface convex toward the object side. The lens L32 is a negative meniscus lens having a surface convex toward the object side. The lens L33 is a biconvex lens.

The fourth lens group G4 has a positive refractive power as a whole. The fourth lens group G4 having a positive refractive power shares the positive refractive power with the third lens group G3, is able to suppress occurrence of spherical aberration, and is able to suppress fluctuations in spherical aberration during zooming.

It is preferable that the fourth lens group G4 includes a cemented lens configured by cementing one negative lens and one positive lens in order from the object side. In such a case, there is an advantage in suppressing lateral chromatic aberration and longitudinal chromatic aberration. In particular, in a case where the focusing lens group consists of the fourth lens group G4, the fourth lens group G4 includes the cemented lens. Therefore, it is possible to suppress fluctuation in color bleeding caused by fluctuation in lateral chromatic aberration and longitudinal chromatic aberration during focusing. Further, by adopting a configuration using the cemented lens instead of the single lens, the frame body of the focusing lens group can be simplified. As a result, there is an advantage in high-speed focusing.

As an example, the fourth lens group G4 in FIG. 1 consists of two lenses, a negative lens L41 and a positive lens L42, in order from the object side to the image side, and these two lenses are cemented to each other. The lens L41 is a negative meniscus lens having a surface convex toward the object side. The lens L42 is a positive lens having a surface convex toward the object side.

The fifth lens group G5 has a negative refractive power as a whole. By forming the fifth lens group G5 as a lens group having a negative refractive power, it is possible to suppress fluctuation in astigmatism during zooming.

It is preferable that the fifth lens group G5 consists of two negative lenses and one positive lens. In such a case, there is an advantage in suppressing lateral chromatic aberration and fluctuation in astigmatism during zooming.

As an example, the fifth lens group G5 in FIG. 1 consists of three lenses, a negative lens L51, a negative lens L52, and a positive lens L53, in order from the object side to the image side, and the lens L52 and the lens L53 are cemented to each other. The lens L51 is a negative meniscus lens having a surface convex toward the object side. The lens L52 is a negative lens having a surface concave toward the image side. The lens L53 is a positive lens having a surface convex toward the object side.

The sixth lens group G6 has a positive refractive power as a whole. The sixth lens group G6 having a positive refractive power is able to reduce the incident angle of the principal ray of the peripheral angle of view on the image plane Sim.

It is preferable that the sixth lens group G6 consists of a single lens having a positive refractive power. In a case where the number of lenses in the sixth lens group G6 increases and the thickness of the sixth lens group G6 increases, interference with members around the mount may occur. To avoid this, the size of the lens increases in the radial direction. By adopting a configuration using the sixth lens group G6 consisting of a single lens having a positive refractive power, there is an advantage in preventing the above problem.

It is preferable that all the lens surfaces of the sixth lens group G6 each have a shape convex toward the image side. In the imaging apparatus, the sixth lens group G6 is a lens group closest to the imaging element disposed on the image plane Sim. In a case where a lens surface concave toward the image side is present as a surface close to the imaging element, reflected light from a member near the imaging element may return to the imaging element side again and become stray light. All the lens surfaces of the sixth lens group G6 each have a shape convex toward the image side. As a result, there is an advantage in suppressing the stray light. In particular, an excellent effect can be obtained in a lens system having a short back focal length such as an imaging lens mounted on a mirrorless camera.

As an example, the sixth lens group G6 in FIG. 1 consists of one positive lens L61. The lens L61 is a positive meniscus lens having a surface convex toward the image side.

Next, a preferable configuration relating to conditional expressions will be described. However, the conditional expressions that the zoom lens preferably satisfies are not limited to the conditional expressions described in the form of the expression, and the lower limit and the upper limit are selected from the preferable and more preferable conditional expressions. The conditional expressions may include all conditional expressions obtained through optional combinations.

Assuming that a focal length of the third lens group G3 is f3 and a focal length of the fourth lens group G4 is f4, it is preferable that the zoom lens satisfies Conditional Expression (1). By not allowing the corresponding value of Conditional Expression (1) to be equal to or less than the lower limit, it is possible to suppress occurrence of spherical aberration. By not allowing the corresponding value of Conditional Expression (1) to be equal to or greater than the upper limit, it is possible to increase the refractive power of the third lens group G3. As a result, there is an advantage in achieving reduction in diameter of the lens group closer to the image side than the third lens group G3. In a case where the focusing lens group consists of the fourth lens group G4, by not allowing the corresponding value of Conditional Expression (1) to be equal to or greater than the upper limit, there is an advantage in achieving reduction in diameter of the focusing lens group. In order to obtain more favorable characteristics, it is more preferable that the zoom lens satisfies Conditional Expression (1-1).

$$0.12 < f3/f4 < 1.24 \tag{1}$$

$$0.21 < f3/f4 < 1.1 \tag{1-1}$$

Assuming that a focal length of the second lens group G2 is f2 and a focal length of the fourth lens group G4 is f4, it is preferable that the zoom lens satisfies Conditional Expression (2). By not allowing the corresponding value of Conditional Expression (2) to be equal to or less than the lower limit, there is an advantage in maintaining the zooming effect of the second lens group G2, and there is an advantage in reducing the amount of movement of the second lens group G2 during zooming. By not allowing the corresponding value of Conditional Expression (2) to be equal to or greater than the upper limit, it is possible to suppress the aberration fluctuation during zooming. Thus, it is easy to prevent increases in diameters of the second lens group G2 and the lens group closer to the image side than the second lens group G2. In order to obtain more favorable characteristics, it is more preferable that the zoom lens satisfies Conditional Expression (2-1).

$$-1 < f2/f4 < -0.12 \quad (2)$$

$$-0.84 < f2/f4 < -0.21 \quad (2\text{-}1)$$

Assuming that a focal length of the second lens group G2 is f2 and a focal length of the first lens group G1 is f1, it is preferable that the zoom lens satisfies Conditional Expression (3). By not allowing the corresponding value of Conditional Expression (3) to be equal to or less than the lower limit, there is an advantage in maintaining the zooming effect of the second lens group G2, and there is an advantage in reducing the amount of movement of the second lens group G2 during zooming. By not allowing the corresponding value of Conditional Expression (3) to be equal to or greater than the upper limit, the refractive power of the first lens group G1 can be increased. Therefore, there is an advantage in reducing the amount of movement of the first lens group G1. In order to obtain more favorable characteristics, it is more preferable that the zoom lens satisfies Conditional Expression (3-1).

$$-0.3 < f2/f1 < -0.07 \quad (3)$$

$$-0.24 < f2/f1 < -0.12 \quad (3\text{-}1)$$

Assuming that a focal length of the fifth lens group G5 is f5 and a focal length of the fourth lens group G4 is f4, it is preferable that the zoom lens satisfies Conditional Expression (4). By not allowing the corresponding value of Conditional Expression (4) to be equal to or less than the lower limit, there is an advantage in reducing the amount of movement of the fifth lens group G5 during zooming. As a result, there is an advantage in reducing the total lens length. By not allowing the corresponding value of Conditional Expression (4) to be equal to or greater than the upper limit, there is an advantage in suppressing fluctuation in astigmatism during zooming. In order to obtain more favorable characteristics, it is more preferable that the zoom lens satisfies Conditional Expression (4-1).

$$-0.79 < f5/f4 < -0.1 \quad (4)$$

$$-0.66 < f5/f4 < -0.17 \quad (4\text{-}1)$$

Assuming that a focal length of the sixth lens group G6 is f6 and a focal length of the first lens group G1 is f1, it is preferable that the zoom lens satisfies Conditional Expression (5). By not allowing the corresponding value of Conditional Expression (5) to be equal to or less than the lower limit, there is an advantage in suppressing fluctuation in spherical aberration and fluctuation in field curvature during zooming. By not allowing the corresponding value of Conditional Expression (5) to be equal to or greater than the upper limit, there is an advantage in ensuring telecentricity. In order to obtain more favorable characteristics, it is more preferable that the zoom lens satisfies Conditional Expression (5-1).

$$0.25 < f6/f1 < 1 \quad (5)$$

$$0.43 < f6/f1 < 0.84 \quad (5\text{-}1)$$

Assuming that a distance on the optical axis from a lens surface closest to the object side in the first lens group G1 to an image plane Sim at a telephoto end is Xt1, a distance on the optical axis from the lens surface closest to the object side in the first lens group G1 to the image plane Sim at a wide angle end is Xw1, a distance on the optical axis from a lens surface closest to the object side in the second lens group G2 to the image plane Sim at the telephoto end is Xt2, a distance on the optical axis from the lens surface closest to the object side in the second lens group G2 to the image plane Sim at the wide angle end is Xw2, and a focal length of the first lens group G1 is f1, it is preferable that the zoom lens satisfies Conditional Expression (6). By not allowing the corresponding value of Conditional Expression (6) to be equal to or less than the lower limit, there is an advantage in suppressing the amount of movement of the second lens group G2 during zooming. As a result, there is an advantage in preventing an increase in size of the cam barrel for zooming. By not allowing the corresponding value of Conditional Expression (6) to be equal to or greater than the upper limit, there is an advantage in reducing the amount of extension of the first lens group G1 during zooming. As a result, there is an advantage in achieving reduction in size. In order to obtain more favorable characteristics, it is more preferable that the zoom lens satisfies Conditional Expression (6-1).

$$0.35 < \{(Xt1-Xw1)-(Xt2-Xw2)\}/f1 < 0.55 \quad (6)$$

$$0.4 < \{(Xt1-Xw1)-(Xt2-Xw2)\}/f1 < 0.5 \quad (6\text{-}1)$$

Assuming that a distance on the optical axis from a lens surface closest to the image side in the third lens group G3 to a lens surface closest to the object side in the fifth lens group G5 is Db35, and a focal length of the fourth lens group G4 is f4, it is preferable that the zoom lens satisfies Conditional Expression (7). In this zoom lens, since the third lens group G3 and the fifth lens group G5 move integrally during zooming, the value of Db35 is constant regardless of the zooming state. By not allowing the corresponding value of Conditional Expression (7) to be equal to or less than the lower limit, there is an advantage in ensuring the movable amount of the fourth lens group G4 in a case where the fourth lens group G4 moves. In particular, in a case where the focusing lens group consists of the fourth lens group G4, by not allowing the corresponding value of Conditional Expression (7) to be equal to or less than the lower limit, there is an advantage in ensuring the movable amount of the focusing lens group. By not allowing the corresponding value of Conditional Expression (7) not more than the upper limit, there is an advantage in achieving reduction in total lens length. In order to obtain more favorable characteristics, it is more preferable that the zoom lens satisfies Conditional Expression (7-1).

$$0.11 < Db35/f4 < 0.96 \quad (7)$$

$$0.19 < Db35/f4 < 0.8 \quad (7\text{-}1)$$

Assuming that a distance on the optical axis from a lens surface closest to the object side in the third lens group G3 to a lens surface closest to the image side in the fifth lens group G5 is D3f5r, and a distance on the optical axis from a lens surface closest to the object side in the fourth lens group G4 to a lens surface closest to the image side in the fourth lens group G4 is T4, it is preferable that the zoom lens satisfies Conditional Expression (8). In this zoom lens, since the third lens group G3 and the fifth lens group G5 move integrally during zooming, the value of D3f5r is constant regardless of the zooming state. By not allowing the corresponding value of Conditional Expression (8) not be equal to or less than the lower limit, it is easy to achieve reduction in size of the fourth lens group G4. Particularly, in a case where the focusing lens group consists of the fourth lens group G4, by not allowing the corresponding value of Conditional Expression (8) to be equal to or less than the lower limit, it is easy to achieve reduction in size and weight of the focusing lens group. As a result, there is an advantage in high-speed focusing. By not allowing the corresponding value of Conditional Expression (8) to be equal to or greater than the upper limit, there is an advantage in achieving reduction in total lens length. In order to obtain more favorable characteristics, it is more preferable that the zoom lens satisfies Conditional Expression (8-1).

$$3.06 < D3f5r/T4 < 12.74 \quad (8)$$

$$5\ 0.36 < D3f5r/T4 < 10.62 \quad (8\text{-}1)$$

In a configuration in which the third lens group G3 includes a positive lens closest to the object side, assuming that a focal length of the positive lens closest to the object side in the third lens group G3 is f31, and a focal length of the third lens group G3 is f3, it is preferable that the zoom lens satisfies Conditional Expression (9). By not allowing the corresponding value of Conditional Expression (9) to be equal to or less than the lower limit, it is easy to suppress occurrence of spherical aberration. By not allowing the corresponding value of Conditional Expression (9) to be equal to or greater than the upper limit, there is an advantage in achieving reduction in diameters of the lenses of the third lens group G3 and the fourth lens group G4. In order to obtain more favorable characteristics, it is more preferable that the zoom lens satisfies Conditional Expression (9-1).

$$0.5 < f31/f3 < 2.8 \quad (9)$$

$$0.8 < f31/f3 < 2.4 \quad (9\text{-}1)$$

In a configuration in which the third lens group G3 includes a positive lens closest to the object side, assuming that an Abbe number of the positive lens closest to the object side in the third lens group G3 based on the d line is ν31, it is preferable that the zoom lens satisfies Conditional Expression (10). By not allowing the corresponding value of Conditional Expression (10) to be equal to or less than the lower limit, there is an advantage in correcting longitudinal chromatic aberration. By not allowing the corresponding value of Conditional Expression (10) to be equal to or greater than the upper limit, it is easy to prevent lateral chromatic aberration from being excessively corrected at either the wide angle end or the telephoto end. As a result, there is an advantage in suppressing fluctuation in lateral chromatic aberration over the entire zoom range from the wide angle end to the telephoto end. In order to obtain more favorable characteristics, it is more preferable that the zoom lens satisfies Conditional Expression (10-1).

$$45 < \nu 31 < 97 \quad (10)$$

$$50 < \nu 31 < 85 \quad (10\text{-}1)$$

In the configuration in which the first lens group G1 consists of one negative lens and two positive lenses in order from the object side to the image side, assuming that an average value of Abbe numbers of the two positive lenses of the first lens group G1 based on the d line is ν1pave, it is preferable that the zoom lens satisfies Conditional Expression (11). By not allowing the corresponding value of Conditional Expression (11) to be equal to or less than the lower limit, there is an advantage in correcting longitudinal chromatic aberration. In general, the refractive index of an optical material tends to decrease as the Abbe number increases. Therefore, by not allowing the corresponding value of Conditional Expression (11) to be equal to or greater than the upper limit, it is possible to prevent the refractive index of the positive lens of the first lens group G1 from becoming excessively low. As a result, it is easy to ensure the refractive power without extremely reducing the absolute value of the radius of curvature of the lens surface, and it is possible to prevent enlargement of the lens in the optical axis direction. As a result, there is an advantage in achieving reduction in size. In order to obtain more favorable characteristics, it is more preferable that the zoom lens satisfies Conditional Expression (11-1).

$$60 < \nu 1\text{pave} < 97 \quad (11)$$

$$65 < \nu 1\text{pave} < 90 \quad (11\text{-}1)$$

Assuming that a lateral magnification of the fourth lens group G4 at the wide angle end in a state where the object at infinity is in focus is β4w, and a lateral magnification of the fourth lens group G4 at the telephoto end in a state where the object at infinity is in focus is β4t, it is preferable that the zoom lens satisfies Conditional Expression (12). By not allowing the corresponding value of Conditional Expression (12) to be equal to or less than the lower limit, there is an advantage in achieving an increase in magnification. By not allowing the corresponding value of Conditional Expression (12) to be equal to or greater than the upper limit, it is easy to suppress the amount of movement of the fourth lens group G4 during zooming. As a result, there is an advantage in achieving reduction in total lens length in a state where the zoom lens is housed in the imaging apparatus. In order to obtain more favorable characteristics, it is more preferable that the zoom lens satisfies Conditional Expression (12-1).

$$0.5 < \beta 4t/\beta 4w < 2.1 \quad (12)$$

$$0.8 < \beta 4t/\beta 4w < 1.9 \quad (12\text{-}1)$$

Assuming that a lateral magnification of the second lens group G2 at the wide angle end in a state where the object at infinity is in focus is β2w, and a lateral magnification of the second lens group G2 at the telephoto end in a state where the object at infinity is in focus is β2t, it is preferable that the zoom lens satisfies Conditional Expression (13). By not allowing the corresponding value of Conditional Expression (13) to be equal to or less than the lower limit, there is an advantage in achieving an increase in magnification. By not allowing the corresponding value of Conditional Expression (13) to be equal to or greater than the upper limit, there is an advantage in suppressing fluctuation in various aberrations during zooming, and there is an advantage in particularly suppressing fluctuation in distortion. In order to obtain more favorable characteristics, it is more preferable that the zoom lens satisfies Conditional Expression (13-1).

$$2 < \beta 2t/\beta 2w < 5 \quad (13)$$

$$2.5 < \beta 2t/\beta 2w < 4.5 \quad (13\text{-}1)$$

Assuming that a lateral magnification of the third lens group G3 at the wide angle end in a state where the object at infinity is in focus is β3w, and a lateral magnification of the third lens group G3 at the telephoto end in a state where the object at infinity is in focus is β3t, it is preferable that the zoom lens satisfies Conditional Expression (14). By not allowing the corresponding value of Conditional Expression (14) to be equal to or less than the lower limit, there is an advantage in achieving an increase in magnification. By not allowing the corresponding value of Conditional Expression (14) to be equal to or greater than the upper limit, it is easy to suppress the amount of movement of the third lens group G3 during zooming. As a result, there is an advantage in achieving reduction in total lens length in a state where the zoom lens is housed in the imaging apparatus. In order to obtain more favorable characteristics, it is more preferable that the zoom lens satisfies Conditional Expression (14-1).

$$0.25 < \beta 3t/\beta 3w < 1.4 \quad (14)$$

$$0.35 < \beta 3t/\beta 3w < 1.2 \quad (14\text{-}1)$$

Assuming that a lateral magnification of the second lens group G2 at the wide angle end in a state where the object at infinity is in focus is $\beta 2w$, a lateral magnification of the second lens group G2 at the telephoto end in a state where the object at infinity is in focus is $\beta 2t$, a lateral magnification of the third lens group G3 at the wide angle end in a state where the object at infinity is in focus is $\beta 3w$, and a lateral magnification of the third lens group G3 at the telephoto end in a state where the object at infinity is in focus is $\beta 3t$, it is preferable that the zoom lens satisfies Conditional Expression (15). By not allowing the corresponding value of Conditional Expression (15) to be equal to or less than the lower limit, there is an advantage in achieving reduction in total lens length at the telephoto end. By not allowing the corresponding value of Conditional Expression (15) to be equal to or greater than the upper limit, there is an advantage in suppressing fluctuation in various aberrations during zooming, and there is an advantage in particularly suppressing fluctuation in distortion. In order to obtain more favorable characteristics, it is more preferable that the zoom lens satisfies Conditional Expression (15-1).

$$1.5 < (\beta 2t/\beta 2w)/(\beta 3t/\beta 3w) < 14 \quad (15)$$

$$2 < (\beta 2t/\beta 2w)/(\beta 3t/\beta 3w) < 12 \quad (15\text{-}1)$$

In the configuration in which the focusing lens group consists of the fourth lens group G4, assuming that a lateral magnification of the third lens group G3 at the wide angle end in a state where the object at infinity is in focus is $\beta 3w$, a lateral magnification of the third lens group G3 at the telephoto end in a state where the object at infinity is in focus is $\beta 3t$, a lateral magnification of the fourth lens group G4 at the wide angle end in a state where the object at infinity is in focus is $\beta 4w$, and a lateral magnification of the fourth lens group G4 at the telephoto end in a state where the object at infinity is in focus is $\beta 4t$, it is preferable that the zoom lens satisfies Conditional Expression (16). By not allowing the corresponding value of Conditional Expression (16) to be equal to or less than the lower limit, it is possible to prevent fluctuation in image position caused by the movement of the focusing lens group from becoming excessively large. Therefore, the focusing accuracy can be improved. By not allowing the corresponding value of Conditional Expression (16) to be equal to or greater than the upper limit, it is easy to reduce the amount of movement of the focusing lens group during focusing. In order to obtain more favorable characteristics, it is more preferable that the zoom lens satisfies Conditional Expression (16-1).

$$0.15 < (\beta 3t/\beta 3w)/(\beta 4t/\beta 4w) < 1.5 \quad (16)$$

$$0.2 < (\beta 3t/\beta 3w)/(\beta 4t/\beta 4w) < 1.2 \quad (16\text{-}1)$$

In the configuration in which the focusing lens group consists of the fourth lens group G4, assuming that a lateral magnification of the fourth lens group G4 at the wide angle end in a state where the object at infinity is in focus is $\beta 4w$, and a combined lateral magnification of all the lens groups closer to the image side than the fourth lens group G4 at the wide angle end in a state where the object at infinity is in focus is $\beta 4Rw$, it is preferable that the zoom lens satisfies Conditional Expression (17). By not allowing the corresponding value of Conditional Expression (17) to be equal to or less than the lower limit, it is easy to reduce the amount of movement of the focusing lens group during focusing on the wide angle side. By not allowing the corresponding value of Conditional Expression (17) to be equal to or greater than the upper limit, it is possible to prevent fluctuation in image position from becoming excessively large with the movement of the focusing lens group on the wide angle side. Therefore, the focusing accuracy can be improved. In order to obtain more favorable characteristics, it is more preferable that the zoom lens satisfies Conditional Expression (17-1).

$$2 < (1-\beta 4w^2) \times \beta 4Rw^2 < 6.5 \quad (17)$$

$$2.5 < (1-\beta 4w^2) \times \beta 4Rw^2 < 6 \quad (17\text{-}1)$$

In the configuration in which the focusing lens group consists of the fourth lens group G4, assuming that a lateral magnification of the fourth lens group G4 at the telephoto end in a state where the object at infinity is in focus is $\beta 4t$, and a combined lateral magnification of all the lens groups closer to the image side than the fourth lens group G4 at the telephoto end in a state where the object at infinity is in focus is $\beta 4Rt$, it is preferable that the zoom lens satisfies Conditional Expression (18). By not allowing the corresponding value of Conditional Expression (18) to be equal to or less than the lower limit, it is easy to reduce the amount of movement of the focusing lens group during focusing on the telephoto side. By not allowing the corresponding value of Conditional Expression (18) to be equal to or greater than the upper limit, it is possible to prevent fluctuation in image position caused by the movement of the focusing lens group from becoming excessively large on the telephoto side. Therefore, the focusing accuracy can be improved. In order to obtain more favorable characteristics, it is more preferable that the zoom lens satisfies Conditional Expression (18-1).

$$4 < (1-\beta 3t^2) \times \beta 4Rt^2 < 12 \quad (18)$$

$$4.5 < (1-\beta 4t^2) \times \beta 4Rt^2 < 11 \quad (18\text{-}1)$$

In the configuration in which the focusing lens group consists of the fourth lens group G4, a lateral magnification of the fourth lens group G4 at the wide angle end in a state where the object at infinity is in focus is $\beta 4w$, a combined lateral magnification of all the lens groups closer to the image side than the fourth lens group G4 at the wide angle end in a state where the object at infinity is in focus is $\beta 4Rw$, a lateral magnification of the fourth lens group G4 at the telephoto end in a state where the object at infinity is in focus is $\beta 4t$, and a combined lateral magnification of all the lens groups closer to the image side than the fourth lens group G4 at the telephoto end in a state where the object at infinity is in focus is $\beta 4Rt$, it is preferable that the zoom lens satisfies Conditional Expression (19). By not allowing the corresponding value of Conditional Expression (19) to be equal to or less than the lower limit, in a case where focusing is performed by varying the object distance, it is possible to suppress an increase in a ratio of the amount of movement of the focusing lens group per amount of fluctuation in object distance at the wide angle end to the amount of movement of the focusing lens group per fluctuation in object distance at the telephoto end. As a result, it is possible to suppress the amount of movement of the focusing lens group during focusing on the telephoto side. By not allowing the corresponding value of Conditional Expression (19) to be equal to or greater than the upper limit, it is possible to suppress an increase in a ratio of the amount of movement of the image position per amount of movement of the focusing lens group at the wide angle end to the amount of movement of the image position per the amount of movement of the focusing lens group at the telephoto end. As a result, on the telephoto side, it is possible to prevent fluctuation in image position caused by the movement of the focusing lens group from becoming excessively large. Therefore, the focusing accuracy can be improved. In order to obtain more favorable characteristics, it is more preferable that the zoom lens satisfies Conditional Expression (19-1).

$$1.1<\{(1-\beta 4t^2)\times 4Rt^2\}/\{(1-\beta 4w^2)\times 4Rw^2\}<2.7 \tag{19}$$

$$1.2<\{(1-\beta 4t^2)\times \beta 4Rt^2\}/\{(1-\beta 4w^2)\times \beta 4Rw^2\}<2.4 \tag{19-1}$$

In the configuration in which the image stabilization lens group consists of three lenses, that is, the first lens, the second lens, and the third lens from the image side of the second lens group G2, assuming that a lateral magnification of the image stabilization lens group at the wide angle end in a state where the object at infinity is in focus is βisw and a combined lateral magnification of all lens groups closer to the image side than the image stabilization lens group at the wide angle end in a state where the object at infinity is in focus is βisRw, it is preferable that the zoom lens satisfies Conditional Expression (20). By not allowing the corresponding value of Conditional Expression (20) to be equal to or less than the lower limit, it is possible to prevent the sensitivity of the image stabilization on the wide angle side from becoming excessively high. By not allowing the corresponding value of Conditional Expression (20) to be equal to or greater than the upper limit, it is possible to minimize the amount of movement of the image stabilization lens group during image stabilization on the wide angle side. In order to obtain more favorable characteristics, it is more preferable that the zoom lens satisfies Conditional Expression (20-1).

$$-3.6<(1-\beta isw)\times \beta isRw<-1.8 \tag{20}$$

$$-3.3<(1-\beta isw)\times \beta isRw<-2 \tag{20-1}$$

In the configuration in which the image stabilization lens group consists of three lenses, that is, the first lens, the second lens, and the third lens from the image side of the second lens group G2, assuming that a lateral magnification of the image stabilization lens group at the telephoto end in a state where the object at infinity is in focus is βist and a combined lateral magnification of all lens groups closer to the image side than the image stabilization lens group at the telephoto end in a state where the object at infinity is in focus is βisRt, it is preferable that the zoom lens satisfies Conditional Expression (21). By not allowing the corresponding value of Conditional Expression (21) to be equal to or less than the lower limit, it is possible to prevent the sensitivity of image stabilization on the telephoto side from becoming excessively high. By not allowing the corresponding value of Conditional Expression (21) to be equal to or greater than the upper limit, it is possible to suppress the amount of movement of the image stabilization lens group during image stabilization on the telephoto side. In order to obtain more favorable characteristics, it is more preferable that the zoom lens satisfies Conditional Expression (21-1).

$$-7.5<(1-\beta ist)\times \beta isRt<-3.2 \tag{21}$$

$$-7<(1-\beta ist)\times \beta isRt<-3.5 \tag{21-1}$$

In the configuration in which an image stabilization lens group consists of three lenses, that is, the first lens, the second lens, and the third lens from the image side of the second lens group G2, assuming that a lateral magnification of the image stabilization lens group at the wide angle end in a state where the object at infinity is in focus is βisw, a combined lateral magnification of all lens groups closer to the image side than the image stabilization lens group at the wide angle end in a state where the object at infinity is in focus is βisRw, a lateral magnification of the image stabilization lens group at the telephoto end in a state where the object at infinity is in focus is βist, and a combined lateral magnification of all lens groups closer to the image side than the image stabilization lens group at the telephoto end in a state where the object at infinity is in focus is βisRt, it is preferable that the zoom lens satisfies Conditional Expression (22). By not allowing the corresponding value of Conditional Expression (22) to be equal to or less than the lower limit, the amount of movement of the image stabilization lens group per image stabilization angle on the wide angle side is set to be close to the image stabilization lens group per image stabilization angle on the telephoto side. Thus, it is easy to control the image stabilization. Here, the "image stabilization angle" is an image blur correction angle that can be corrected by moving the image stabilization lens group. By not allowing the corresponding value of Conditional Expression (22) to be equal to or greater than the upper limit, it is possible to prevent a ratio of the amount of movement of the image on the image plane Sim per amount of movement of the image stabilization lens group at the wide angle end to the amount of movement of the image on the image plane Sim per amount of movement of the image stabilization lens group at the telephoto end, from becoming excessively large. As a result, it is possible to prevent difficulty in controlling image stabilization. In order to obtain more favorable characteristics, it is more preferable that the zoom lens satisfies Conditional Expression (22-1).

$$1.5<\{(1-\beta ist)\times \beta isRt\}/\{(1-\beta isw)\times \beta isRw\}<2.4 \tag{22}$$

$$1.7<\{(1-\beta ist)\times \beta isRt\}/\{(1-\beta isw)\times \beta isRw\}<2.2 \tag{22-1}$$

In the configuration in which the first lens group G1 includes at least one negative lens and at least one positive lens, assuming that an average value of the partial dispersion ratios of all negative lenses of the first lens group G1 between the g line and the F line is θ1n, and an average value of the partial dispersion ratios of all the positive lenses of the first lens group G1 between the g line and the F line is θ1p, it is preferable that the zoom lens satisfy Conditional Expression (23). By not allowing the corresponding value of Conditional Expression (23) to be equal to or less than the lower limit, there is an advantage in suppressing fluctuation in primary chromatic aberration during zooming. By not allowing the corresponding value of Conditional Expression (23) to be equal to or greater than the upper limit, there is an advantage in suppressing occurrence of secondary chromatic aberration at the telephoto end. It should be noted that a partial dispersion ratio θ of a lens between the g line and the F line is defined as θ=(Ng−NF)/(NF−NC), where the refractive indices of the lens at the g line, the F line, and the C line are Ng, NF, and NC, respectively. In order to obtain more favorable characteristics, it is more preferable that the zoom lens satisfies Conditional Expression (23-1).

$$-0.05<\theta 1n-\theta 1p<0.08 \quad (23)$$

$$0<\theta 1n-\theta 1p<0.075 \quad (23-1)$$

Assuming that an average value of the partial dispersion ratios of all the negative lenses of the first lens group G1 and the second lens group G2 between the g line and the F line is θ12n, and an average value of the partial dispersion ratios of all the positive lenses of the first lens group G1 and the second lens group G2 between the g line and the F line is θ12p, it is preferable that the zoom lens satisfies Conditional Expression (24). By satisfying Conditional Expression (24), there is an advantage in suppressing fluctuation in secondary chromatic aberration during zooming. In order to obtain more favorable characteristics, it is more preferable that the zoom lens satisfies Conditional Expression (24-1).

$$0<\theta 12n-\theta 12p<0.025 \quad (24)$$

$$0<\theta 12n-\theta 12p<0.02 \quad (24-1)$$

In the configuration in which the first lens group G1 includes a cemented lens configured by cementing one negative lens and one positive lens, assuming that a refractive index of the negative lens constituting the cemented lens of the first lens group G1 at the d line is N1n and a refractive index of the positive lens constituting the cemented lens of the first lens group G1 at the d line is N1p, it is preferable that the zoom lens satisfies Conditional Expression (25). By not allowing the corresponding value of Conditional Expression (25) to be equal to or less than the lower limit, it is possible to prevent the absolute value of the radius of curvature of each lens surface of the cemented lens from becoming excessively small. As a result, it is possible to prevent enlargement of the lens in the optical axis direction. By not allowing the corresponding value of Conditional Expression (25) to be equal to or greater than the upper limit, it is possible to suppress occurrence of spherical aberration. In order to obtain more favorable characteristics, it is more preferable that the zoom lens satisfies Conditional Expression (25-1).

$$0.01<N1n-N1p<0.48 \quad (25)$$

$$0.1<N1n-N1p<0.44 \quad (25-1)$$

In the configuration in which the first lens group G1 includes a cemented lens configured by cementing one negative lens and one positive lens, assuming that an Abbe number of the negative lens constituting the cemented lens of the first lens group G1 based on the d line is ν1n and an Abbe number of the positive lens constituting the cemented lens of the first lens group G1 based on the d line is ν1p, it is preferable that the zoom lens satisfies Conditional Expression (26). By not allowing the corresponding value of Conditional Expression (26) to be equal to or less than the lower limit, there is an advantage in correcting longitudinal chromatic aberration. By not allowing the corresponding value of Conditional Expression (26) to be equal to or greater than the upper limit, it is easy to prevent longitudinal chromatic aberration from being excessively corrected. In order to obtain more favorable characteristics, it is more preferable that the zoom lens satisfies at least one of Conditional Expressions (26-1), (26-2), and (26-3).

$$20<\nu 1p-\nu 1n<70 \quad (26)$$

$$30<\nu 1p-\nu 1n<65 \quad (26-1)$$

$$20<\nu 1p-\nu 1n<55 \quad (26-2)$$

$$30<\nu 1p-\nu 1n<45 \quad (26-3)$$

In the configuration in which the third lens group G3 includes a cemented lens configured by cementing one negative lens and one positive lens, assuming that a refractive index of the negative lens constituting the cemented lens of the third lens group G3 at the d line is N3n and a refractive index of the positive lens constituting the cemented lens of the third lens group G3 at the d line is N3p, it is preferable that the zoom lens satisfies Conditional Expression (27). By not allowing the corresponding value of Conditional Expression (27) to be equal to or less than the lower limit, it is possible to prevent the absolute value of the radius of curvature of each lens surface of the cemented lens from becoming excessively small. As a result, it is possible to prevent enlargement of the lens in the optical axis direction. By not allowing the corresponding value of Conditional Expression (27) to be equal to or greater than the upper limit, it is possible to suppress occurrence of spherical aberration. In order to obtain more favorable characteristics, it is more preferable that the zoom lens satisfies Conditional Expression (27-1).

$$0.1<N3n-N3p<0.5 \quad (27)$$

$$0.15<N3n-N3p<0.4 \quad (27-1)$$

In the configuration in which the third lens group G3 includes a cemented lens configured by cementing one negative lens and one positive lens, assuming that an Abbe number of the negative lens constituting the cemented lens of the third lens group G3 based on the d line is ν3n and an Abbe number of the positive lens constituting the cemented lens of the third lens group G3 based on the d line is ν3p, it is preferable that the zoom lens satisfies Conditional Expression (28). By not allowing the corresponding value of Conditional Expression (28) to be equal to or less than the lower limit, there is an advantage in correcting longitudinal chromatic aberration. By not allowing the corresponding value of Conditional Expression (28) to be equal to or greater than the upper limit, it is easy to prevent longitudinal chromatic aberration from being excessively corrected. In order to obtain more favorable characteristics, it is more preferable that the zoom lens satisfies Conditional Expression (28-1).

$$20<\nu 3p-\nu 3n<65 \quad (28)$$

$$30<\nu 3p-\nu 3n<60 \quad (28-1)$$

Assuming that a focal length of the zoom lens at the wide angle end in a state where the object at infinity is in focus is fw and a focal length of the first lens group G1 is f1, it is preferable that the zoom lens satisfies Conditional Expression (29). By not allowing the corresponding value of Conditional Expression (29) to be equal to or less than the lower limit, there is an advantage in achieving reduction in total lens length. By not allowing the corresponding value of Conditional Expression (29) to be equal to or greater than the upper limit, there is an advantage in suppressing fluctuation in various aberrations during zooming. In order to obtain more favorable characteristics, it is more preferable that the zoom lens satisfies Conditional Expression (29-1).

$$0.36<fw/f1<0.5 \quad (29)$$

$$0.42<fw/f1<0.48 \quad (29-1)$$

Assuming that a focal length of the zoom lens at the wide angle end in a state where the object at infinity is in focus is fw and a focal length of the second lens group G2 is f2, it is preferable that the zoom lens satisfies Conditional Expression (30). By not allowing the corresponding value of Conditional Expression (30) to be equal to or less than the lower limit, there is an advantage in suppressing fluctuation in various aberrations during zooming, and there is an advantage in particularly suppressing fluctuation in distortion. By not allowing the corresponding value of Conditional Expression (30) to be equal to or greater than the upper limit, there is an advantage in achieving an increase in magnification. In order to obtain more favorable characteristics, it is more preferable that the zoom lens satisfies Conditional Expression (30-1).

$$-3<fw/f2<-1.8 \tag{30}$$

$$-2.8<fw/f2<-2.1 \tag{30-1}$$

Assuming that a focal length of the zoom lens at the wide angle end in a state where the object at infinity is in focus is fw and a focal length of the third lens group G3 is f3, it is preferable that the zoom lens satisfies Conditional Expression (31). By not allowing the corresponding value of Conditional Expression (31) to be equal to or less than the lower limit, there is an advantage in achieving an increase in magnification. By not allowing the corresponding value of Conditional Expression (31) to be equal to or greater than the upper limit, there is an advantage in suppressing fluctuation in various aberrations during zooming, and there is an advantage in particularly suppressing fluctuation in spherical aberration. In order to obtain more favorable characteristics, it is more preferable that the zoom lens satisfies Conditional Expression (31-1).

$$1.3<fw/f3<3.2 \tag{31}$$

$$1.5<fw/f3<2.8 \tag{31-1}$$

In the configuration in which the focusing lens group consists of the fourth lens group G4, assuming that a focal length of the zoom lens at the wide angle end is fw and a focal length of the fourth lens group G4 is f4 in a state where the object at infinity is in focus, it is preferable that the zoom lens satisfies Conditional Expression (32). By not allowing the corresponding value of Conditional Expression (32) to be equal to or less than the lower limit, there are advantages in achieving an increase in magnification and reducing the amount of movement of the focusing lens group during focusing. By not allowing the corresponding value of Conditional Expression (32) to be equal to or greater than the upper limit, there is an advantage in suppressing fluctuation in spherical aberration and fluctuation in field curvature during focusing. In order to obtain more favorable characteristics, it is more preferable that the zoom lens satisfies Conditional Expression (32-1).

$$0.6<fw/f4<2.2 \tag{32}$$

$$0.8<fw/f4<1.9 \tag{32-1}$$

Assuming that a focal length of the zoom lens at the wide angle end in a state where the object at infinity is in focus is fw and a focal length of the fifth lens group G5 is f5, it is preferable that the zoom lens satisfies Conditional Expression (33). By not allowing the corresponding value of Conditional Expression (33) to be equal to or less than the lower limit, there is an advantage in suppressing fluctuation in various aberrations during zooming. By not allowing the corresponding value of Conditional Expression (33) to be equal to or greater than the upper limit, there is an advantage in achieving an increase in magnification. In order to obtain more favorable characteristics, it is more preferable that the zoom lens satisfies Conditional Expression (33-1).

$$-3.8<fw/f5<-2.2 \tag{33}$$

$$-3.6<fw/f5<-2.5 \tag{33-1}$$

Assuming that a focal length of the zoom lens at the wide angle end in a state where the object at infinity is in focus is fw and a focal length of the sixth lens group G6 is f6, it is preferable that the zoom lens satisfies Conditional Expression (34). By not allowing the corresponding value of Conditional Expression (34) from becoming equal to or lower than the lower limit, there is an advantage in reducing the incident angle of the off-axis principal ray to the image plane Sim. By not allowing the corresponding value of Conditional Expression (34) to be equal to or greater than the upper limit, there is an advantage in achieving reduction in total lens length. In order to obtain more favorable characteristics, it is more preferable that the zoom lens satisfies Conditional Expression (34-1).

$$0.5<fw/f6<0.9 \tag{34}$$

$$0.65<fw/f6<0.8 \tag{34-1}$$

Assuming that a focal length of the zoom lens at the telephoto end in a state where the object at infinity is in focus is ft and a focal length of the first lens group G1 is f1, it is preferable that the zoom lens satisfies Conditional Expression (35). By not allowing the corresponding value of Conditional Expression (35) to be equal to or less than the lower limit, there is an advantage in achieving reduction in total lens length. By not allowing the corresponding value of Conditional Expression (35) to be equal to or greater than the upper limit, there is an advantage in suppressing fluctuation in various aberrations during zooming. In order to obtain more favorable characteristics, it is more preferable that the zoom lens satisfies Conditional Expression (35-1).

$$1.7<ft/f1<1.96 \tag{35}$$

$$1.75<ft/f1<1.92 \tag{35-1}$$

Assuming that a focal length of the zoom lens at the telephoto end in a state where the object at infinity is in focus is ft and a focal length of the second lens group G2 is f2, it is preferable that the zoom lens satisfies Conditional Expression (36). By not allowing the corresponding value of Conditional Expression (36) not be equal to or less than the lower limit, there is an advantage in suppressing fluctuation in various aberrations during zooming, and there is an advantage in particularly suppressing fluctuation in distortion. By not allowing the corresponding value of Conditional Expression (36) to be equal to or greater than the upper limit, there is an advantage in achieving an increase in magnification. In order to obtain more favorable characteristics, it is more preferable that the zoom lens satisfies Conditional Expression (36-1).

$$-12<ft/f2<-8 \tag{36}$$

$$-11<ft/f2<-8.5 \tag{36-1}$$

Assuming that a focal length of the zoom lens at the telephoto end in a state where the object at infinity is in focus is ft and a focal length of the third lens group G3 is f3, it is preferable that the zoom lens satisfies Conditional Expression (37). By not allowing the corresponding value of Conditional Expression (37) to be equal to or less than the lower limit, there is an advantage in achieving an increase in magnification. By not allowing the corresponding value of Conditional Expression (37) to be equal to or greater than the upper limit, there is an advantage in suppressing fluctuation in various aberrations during zooming, and there is an advantage in particularly suppressing fluctuation in spherical aberration. In order to obtain more favorable characteristics, it is more preferable that the zoom lens satisfies Conditional Expression (37-1).

$$5 < ft/f3 < 12 \tag{37}$$

$$6 < ft/f3 < 11 \tag{37-1}$$

In the configuration in which the focusing lens group consists of the fourth lens group G4, assuming that a focal length of the zoom lens at the telephoto end in a state where the object at infinity is in focus is ft and a focal length of the fourth lens group G4 is f4, it is preferable that the zoom lens satisfies Conditional Expression (38). By not allowing the corresponding value of Conditional Expression (38) to be equal to or less than the lower limit, there are advantages in achieving an increase in magnification and reducing the amount of movement of the focusing lens group during focusing. By not allowing the corresponding value of Conditional Expression (38) to be equal to or greater than the upper limit, there is an advantage in suppressing fluctuation in spherical aberration and fluctuation in field curvature during focusing. In order to obtain more favorable characteristics, it is more preferable that the zoom lens satisfies Conditional Expression (38-1).

$$2.5 < ft/f4 < 8 \tag{38}$$

$$3 < ft/f4 < 70.5 \tag{38-1}$$

Assuming that a focal length of the zoom lens at the telephoto end in a state where the object at infinity is in focus is ft and a focal length of the fifth lens group G5 is f5, it is preferable that the zoom lens satisfies Conditional Expression (39). By not allowing the corresponding value of Conditional Expression (39) to be not equal to or less than the lower limit, there is an advantage in suppressing fluctuation in various aberrations during zooming. By not allowing the corresponding value of Conditional Expression (39) at the upper limit or more, there is an advantage in achieving an increase in magnification. In order to obtain more favorable characteristics, it is more preferable that the zoom lens satisfies Conditional Expression (39-1).

$$-15 < ft/f5 < -10 \tag{39}$$

$$-14.5 < ft/f5 < -10.5 \tag{39-1}$$

Assuming that a focal length of the zoom lens at the telephoto end in a state where the object at infinity is in focus is ft and a focal length of the sixth lens group G6 is f6, it is preferable that the zoom lens satisfies Conditional Expression (40). By not allowing the corresponding value of Conditional Expression (40) from becoming equal to or lower than the lower limit, there is an advantage in reducing the incident angle of the off-axis principal ray to the image plane Sim. By not allowing the corresponding value of Conditional Expression (40) to be equal to or greater than the upper limit, there is an advantage in achieving reduction in total lens length. In order to obtain more favorable characteristics, it is more preferable that the zoom lens satisfies Conditional Expression (40-1).

$$2 < ft/f6 < 4 \tag{40}$$

$$2.5 < ft/f6 < 3.5 \tag{40-1}$$

It is preferable that the aperture stop St is disposed between the lens surface closest to the image side in the second lens group G2 and the lens surface closest to the image side in the fourth lens group G4. By disposing the aperture stop St in such a manner, there is an advantage in achieving reduction in diameter of the lens. In particular, in a case where the focusing lens group consists of the fourth lens group G4, it is easy to achieve reduction in size and weight of the focusing lens group. As a result, there is an advantage in high-speed focusing. It is more preferable that the aperture stop St is disposed in the third lens group G3.

FIG. 1 shows an example in which the sixth lens group G6 does not move during zooming and the other five lens groups move. However, in the zoom lens of the present disclosure, during zooming, the distance between the adjacent lens groups changes, and the third lens group G3 and the fifth lens group G5 move on the same movement loci. In such a case, it is possible to adopt another aspect of the lens groups that move and the lens groups that remain stationary during zooming. For example, all the lens groups may move during zooming. In such a case, there is an advantage in suppressing aberration fluctuation during zooming.

Further, the number of lenses constituting each lens group may be different from that in the example shown in FIG. 1. For example, the second lens group G2 can be configured to consist of four lenses. In a case where the second lens group G2 consists of four lenses, for example, the second lens group G2 can be configured to consist of, in order from the object side to the image side, a single lens having a positive refractive power, a cemented lens in which a negative lens and a positive lens are cemented in order from the object side, and a single lens having a negative refractive power.

The fourth lens group G4 can be configured to consist of three lenses. In a case where the fourth lens group G4 consists of three lenses, for example, the fourth lens group G4 can be configured to consist of, in order from the object side to the image side, a single lens having a positive refractive power, and a cemented lens in which a negative lens and a positive lens are cemented in order from the object side.

The above-mentioned preferred configurations and available configurations including the configurations relating to the conditional expressions may be any combination, and it is preferable to optionally adopt the configurations in accordance with necessary specification. Next, examples of the zoom lens of the present disclosure will be described.

Example 1

FIG. 1 is a cross-sectional view of a configuration and movement loci of the zoom lens of Example 1, and the illustration method thereof is as described above. Therefore, repeated description is partially omitted. The zoom lens of Example 1 consists of, in order from the object side to the image side, a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power. During zooming from the wide angle end to the telephoto end, the five lens groups from the first lens group G1 to the fifth lens group G5 move along the optical axis Z by changing the distance between the adjacent lens groups in the optical axis direction, and the sixth lens group G6 remains stationary with respect to the image plane Sim. In addition, during zooming from the wide angle end to the telephoto end, the third lens group G3 and the fifth lens group G5 move integrally. The first lens group G1 consists of three lenses L11 to L13 in order from the object side to the image side. The second lens group G2 consists of five lenses L21 to L25 in order from the object side to the image side. The third lens group G3 consists of, in order from the object side to the image side, three lenses L31 to L33 and an aperture stop St. The fourth lens group G4 consists of two lenses L41 to L42 in order from the object side to the image side. The fifth lens group G5 consists of three lenses L51 to L53 in order from the object side to the image side. The sixth lens group G6 consists of one lens L61. The focusing lens group consists of a fourth lens group G4, and the fourth lens group G4 moves to the object side during focusing from the object at infinity to the closest object. The image stabilization lens group consists of three lenses L23 to L25. The outline of the zoom lens of Example 1 has been described above.

Regarding the zoom lens of Example 1, Table 1 shows basic lens data, Table 2 shows specification and variable surface distance, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of Nd shows a refractive index of each constituent element at the d line, the column of νd shows an Abbe number of each constituent element at the d line, and the column of θgF shows a partial dispersion ratio of each constituent element between the g line and the F line. For lenses, the column of materials shows material names of the respective lenses and names of manufacturers thereof with periods interposed therebetween. The names of the manufacturers are shown schematically. "OHARA" is Ohara Co., Ltd., "HOYA" is HOYA CORPORATION, "NHG" is Hubei New HuaGuang Information Materials Co., Ltd, "CDGM" is Chengdu Guangming Photoelectric, and "SUMITA" is SUMITA OPTICAL GLASS, Inc.

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the symbol DD[ ] is used for each variable surface distance during zooming, and the object side surface number of the distance is given in [ ] and is noted in the column D.

Table 2 shows the zoom ratio Zr, the focal length f, the open F number FNo., the maximum total angle of view 2ω, and the variable surface distance during zooming.)(°) in the place of 2ω indicates that the unit thereof is a degree. In Table 2, the values in the wide angle end state, the middle focal length state, and the telephoto end state are shown in columns labeled WIDE, MIDDLE, and TELE, respectively. The values shown in Tables 1 and 2 are values in the case of using the d line as a reference in a state where the object at infinity is in focus.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m=3, 4, 5, . . . , 10) shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of the paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | νd | θgF | Material |
|---|---|---|---|---|---|---|
| 1 | 152.11324 | 2.000 | 1.91082 | 35.25 | 0.58224 | TAFD35.HOYA |
| 2 | 80.45669 | 5.494 | 1.48749 | 70.44 | 0.53062 | FC5.HOYA |
| 3 | 1707.06732 | 0.150 | | | | |
| 4 | 91.53278 | 5.457 | 1.48749 | 70.44 | 0.53062 | FC5.HOYA |
| 5 | −1030.38281 | DD[5] | | | | |
| 6 | 71.26382 | 1.000 | 1.80400 | 46.53 | 0.55775 | S-LAH65VS.OHARA |
| 7 | 34.28371 | 5.375 | 1.61800 | 63.33 | 0.54414 | S-PHM52.OHARA |
| 8 | −124.58862 | 3.236 | | | | |
| 9 | −391.95842 | 1.010 | 1.80400 | 46.53 | 0.55775 | S-LAH65VS.OHARA |
| 10 | 16.15313 | 4.460 | 1.84666 | 23.78 | 0.62054 | S-TIH53W.OHARA |
| 11 | 37.05858 | 3.824 | | | | |
| 12 | −32.23284 | 1.000 | 1.83481 | 42.74 | 0.56490 | S-LAH55VS.OHARA |
| 13 | −688.18529 | DD[13] | | | | |
| *14 | 36.07185 | 4.370 | 1.51633 | 64.06 | 0.53345 | L-BSL7.OHARA |
| *15 | −179.85406 | 0.150 | | | | |

TABLE 1-continued

| | Example 1 | | | | | |
|---|---|---|---|---|---|---|
| Sn | R | D | Nd | vd | θgF | Material |
| 16 | 40.96697 | 1.000 | 1.71736 | 29.52 | 0.60483 | S-TIH1.OHARA |
| 17 | 21.67391 | 7.010 | 1.49700 | 81.54 | 0.53748 | S-FPL51.OHARA |
| 18 | −44.26074 | 2.005 | | | | |
| 19(St) | ∞ | DD[19] | | | | |
| 20 | 26.77188 | 1.000 | 1.83481 | 42.74 | 0.56490 | S-LAH55VS.OHARA |
| 21 | 17.82445 | 4.633 | 1.51680 | 64.20 | 0.53430 | BSC7.HOYA |
| 22 | 1923.26341 | DD[22] | | | | |
| 23 | 41.54363 | 1.000 | 1.80400 | 46.53 | 0.55775 | S-LAH65VS.OHARA |
| 24 | 13.17343 | 2.259 | | | | |
| 25 | −171.69805 | 1.010 | 1.51680 | 64.20 | 0.53430 | BSC7.HOYA |
| 26 | 11.68002 | 2.960 | 1.65412 | 39.68 | 0.57378 | S-NBH5.OHARA |
| 27 | 60.72843 | DD[27] | | | | |
| 28 | −65.65681 | 2.746 | 1.56732 | 42.82 | 0.57309 | S-TIL26.OHARA |
| 29 | −31.49866 | 33.181 | | | | |
| 30 | ∞ | 2.850 | 1.54763 | 54.99 | 0.55229 | |
| 31 | ∞ | 1.139 | | | | |

TABLE 2

| | Example 1 | | |
|---|---|---|---|
| | WIDE | MIDDLE | TELE |
| Zr | 1.0 | 1.8 | 4.0 |
| f | 72.159 | 127.952 | 291.500 |
| FNo. | 4.11 | 5.03 | 5.78 |
| 2ω(°) | 21.6 | 12.4 | 5.6 |
| DD[5] | 2.002 | 23.035 | 70.279 |
| DD[13] | 19.161 | 7.113 | 1.535 |
| DD[19] | 13.213 | 6.588 | 14.720 |
| DD[22] | 3.184 | 9.809 | 1.677 |
| DD[27] | 2.531 | 14.330 | 33.066 |

TABLE 3

| | Example 1 | |
|---|---|---|
| Sn | 14 | 15 |
| KA | 1.0000000E+00 | 1.0000000E+00 |
| A3 | 0.0000000E+00 | 0.0000000E+00 |
| A4 | −3.6276540E−06 | 8.8940965E−06 |
| A5 | 1.4623254E−07 | 1.9637941E−07 |
| A6 | −6.0012482E−09 | −2.4323360E−08 |
| A7 | 8.3439770E−10 | 2.7179316E−09 |
| A8 | 3.5870086E−11 | 5.0088597E−12 |
| A9 | −7.1670975E−12 | −1.2343474E−11 |
| A10 | −2.5507058E−14 | 1.5417634E−13 |

Figure 3:
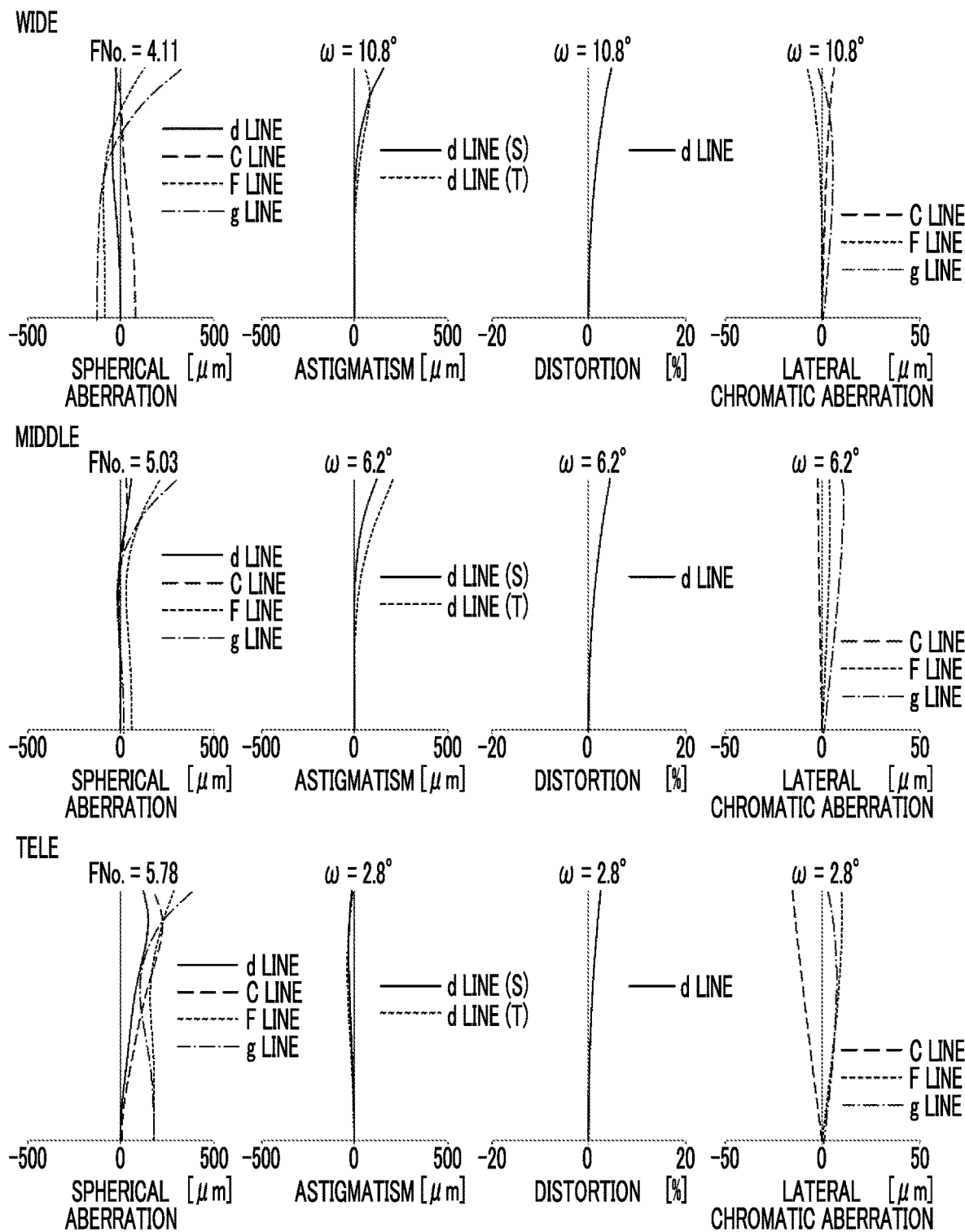
FIG. 3 is a diagram showing aberrations of the zoom lens of Example 1.

FIG. 3 is a diagram showing aberrations of the zoom lens of Example 1 in a state where the object at infinity is in focus. In FIG. 3, in order from the left side, spherical aberration, astigmatism, distortion, and lateral chromatic aberration are shown. In FIG. 3, the upper part labeled by "WIDE" shows aberrations in the wide angle end state, the middle part labeled by "MIDDLE" shows aberrations in the middle focal length state, and the lower part labeled by "TELE" shows aberrations in the telephoto end state. In spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration, aberrations at the C line, the F line, and the g line are respectively indicated by the long dashed line, the short dashed line, and the chain line. In spherical aberration diagram, FNo. indicates an F number. In the other aberration diagrams, ω indicates a half angle of view.

Symbols, meanings, description methods, and illustration methods of the respective data pieces according to Example 1 are the same as those in the following examples unless otherwise specified. Therefore, in the following description, repeated description will be omitted.

Example 2

Figure 4:
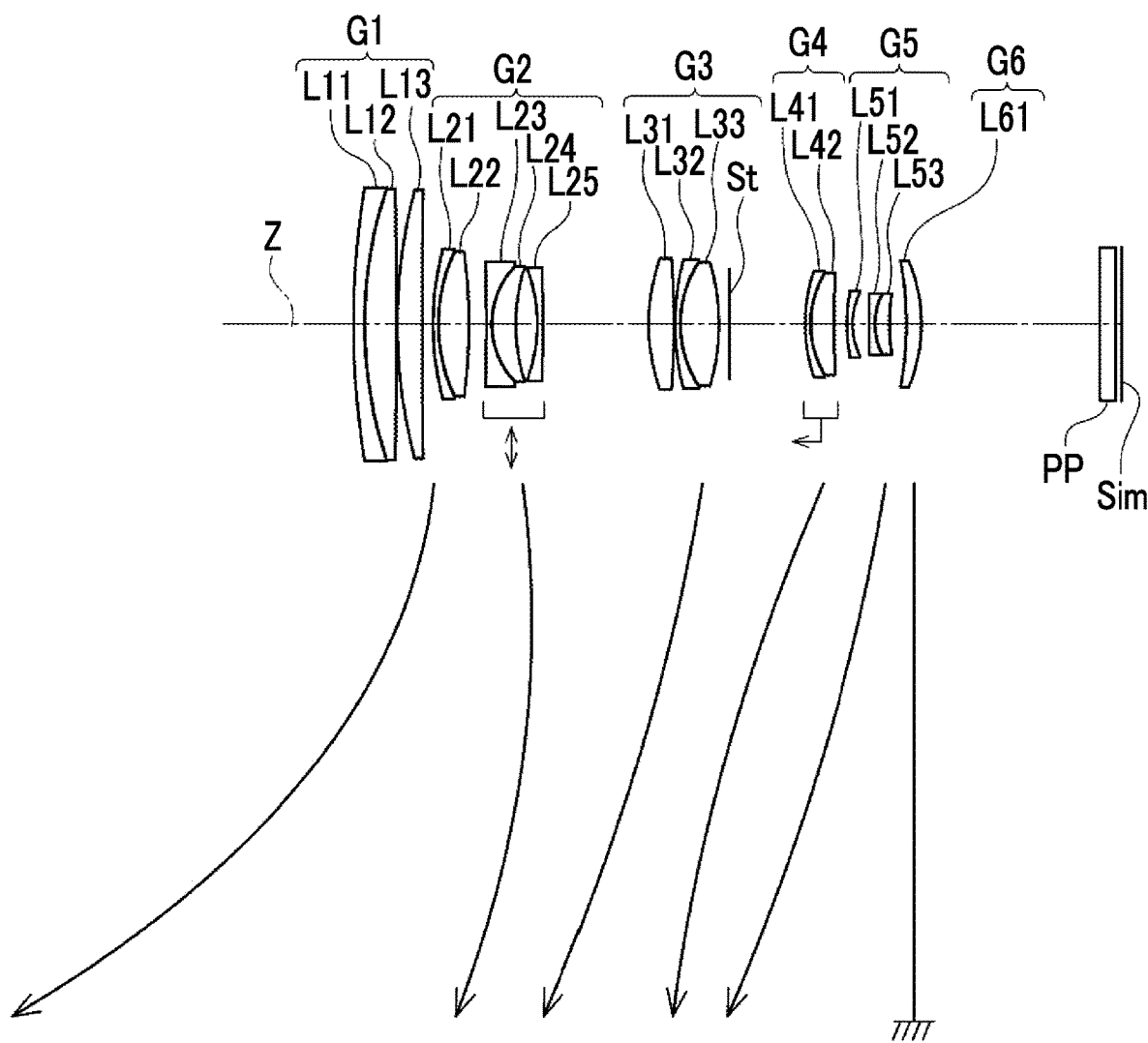
FIG. 4 is cross-sectional views showing a configuration of a zoom lens of Example 2 and a diagram showing movement loci thereof.
Figure 5:
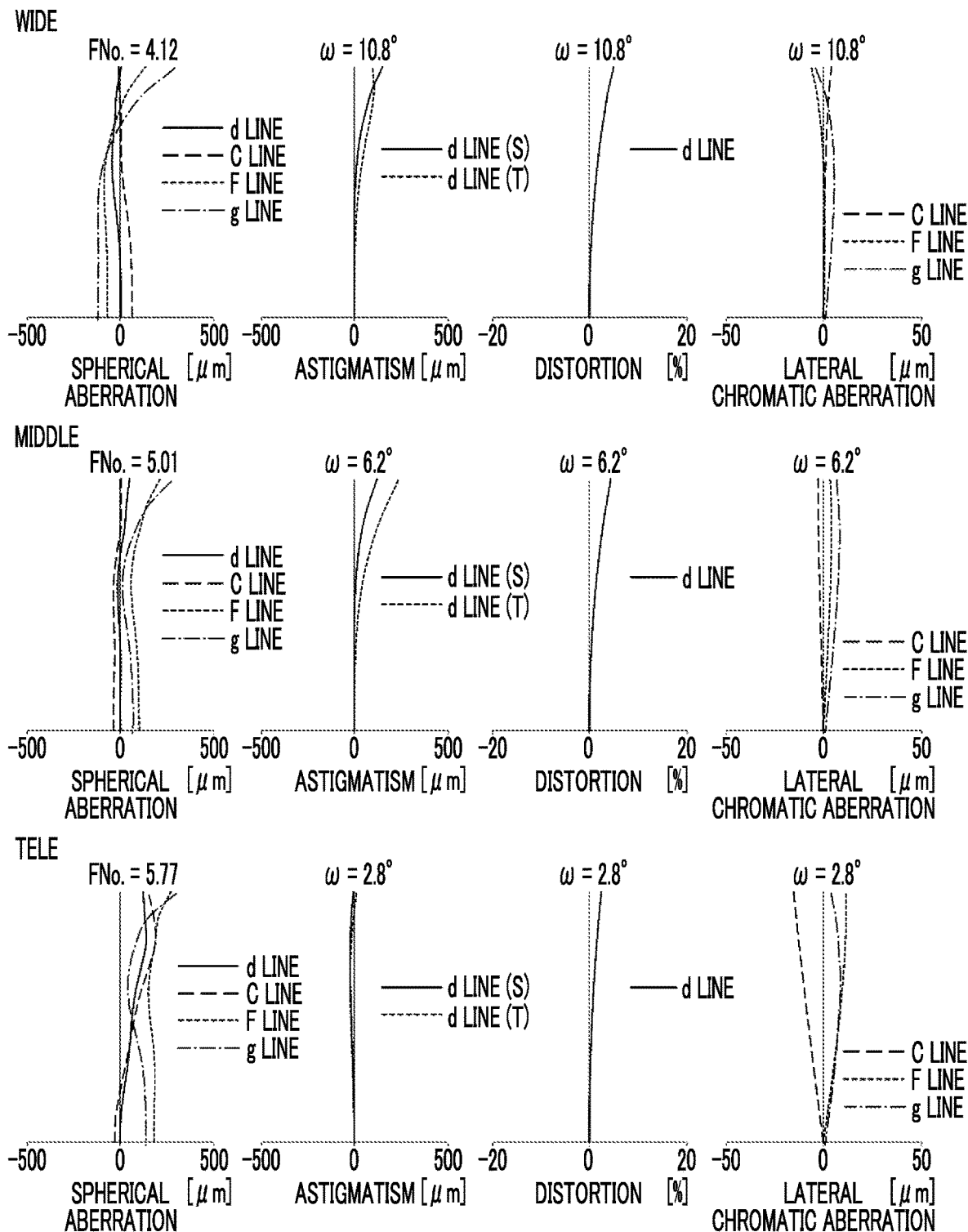
FIG. 5 is a diagram showing aberrations of the zoom lens of Example 2.

FIG. 4 shows a cross-sectional view of a configuration and movement loci of the zoom lens of Example 2. The zoom lens of Example 2 has the same configuration as the outline of the zoom lens of Example 1. Regarding the zoom lens of Example 2, Table 4 shows basic lens data, Table 5 shows specification and variable surface distances, and Table 6 shows aspheric surface coefficients thereof, and FIG. 5 shows aberration diagrams.

TABLE 4

| | Example 2 | | | | | |
|---|---|---|---|---|---|---|
| Sn | R | D | Nd | vd | θgF | Material |
| 1 | 167.01465 | 2.000 | 1.63980 | 34.47 | 0.59233 | S-TIM27.OHARA |
| 2 | 82.60449 | 5.816 | 1.48749 | 70.44 | 0.53062 | FC5.HOYA |
| 3 | −1715.53128 | 0.150 | | | | |
| 4 | 101.37001 | 4.537 | 1.41390 | 100.82 | 0.53373 | K-FIR100UV.SUMITA |
| 5 | 2079.05214 | DD[5] | | | | |
| 6 | 55.79937 | 1.000 | 1.80400 | 46.53 | 0.55775 | S-LAH65VS.OHARA |
| 7 | 33.51107 | 5.539 | 1.51633 | 64.14 | 0.53531 | S-BSL7.OHARA |
| 8 | −109.91376 | 3.184 | | | | |

TABLE 4-continued

Example 2

| Sn | R | D | Nd | νd | θgF | Material |
|---|---|---|---|---|---|---|
| 9 | −749.86211 | 1.010 | 1.80400 | 46.53 | 0.55775 | S-LAH65VS.OHARA |
| 10 | 16.05746 | 4.358 | 1.84666 | 23.78 | 0.62054 | S-TIH53W.OHARA |
| 11 | 35.66158 | 3.950 | | | | |
| 12 | −30.59571 | 1.000 | 1.83481 | 42.74 | 0.56490 | S-LAH55VS.OHARA |
| 13 | −367.07563 | DD[13] | | | | |
| *14 | 35.18587 | 4.675 | 1.51633 | 64.06 | 0.53345 | L-BSL7.OHARA |
| *15 | −122.22637 | 0.150 | | | | |
| 16 | 47.09115 | 1.000 | 1.68893 | 31.07 | 0.60041 | S-TIM28.OHARA |
| 17 | 22.01883 | 7.010 | 1.49700 | 81.54 | 0.53748 | S-FPL51.OHARA |
| 18 | −42.91360 | 2.000 | | | | |
| 19(St) | ∞ | DD[19] | | | | |
| 20 | 31.67685 | 1.000 | 1.83481 | 42.74 | 0.56490 | S-LAH55VS.OHARA |
| 21 | 18.77660 | 4.325 | 1.61800 | 63.33 | 0.54414 | S-PHM52.OHARA |
| 22 | 352.49047 | DD[22] | | | | |
| 23 | 37.09716 | 1.000 | 1.85150 | 40.78 | 0.56958 | S-LAH89.OHARA |
| 24 | 13.94985 | 3.067 | | | | |
| 25 | −986.30972 | 1.010 | 1.51633 | 64.14 | 0.53531 | S-BSL7.OHARA |
| 26 | 12.31791 | 2.673 | 1.64769 | 33.79 | 0.59393 | S-TIM22.OHARA |
| 27 | 40.71083 | DD[27] | | | | |
| 28 | −67.80415 | 2.735 | 1.58144 | 40.75 | 0.57757 | S-TIL25.OHARA |
| 29 | −32.14071 | 32.609 | | | | |
| 30 | ∞ | 2.850 | 1.54763 | 54.99 | 0.55229 | |
| 31 | ∞ | 1.132 | | | | |

TABLE 5

Example 2

| | WIDE | MIDDLE | TELE |
|---|---|---|---|
| Zr | 1.0 | 1.8 | 4.0 |
| f | 72.141 | 127.921 | 291.428 |
| FNo. | 4.12 | 5.01 | 5.77 |
| 2ω(°) | 21.6 | 12.4 | 5.6 |
| DD[5] | 2.000 | 24.025 | 71.073 |
| DD[13] | 19.259 | 7.396 | 1.593 |
| DD[19] | 13.766 | 7.110 | 14.533 |
| DD[22] | 2.443 | 9.099 | 1.676 |
| DD[27] | 3.081 | 14.634 | 32.795 |

TABLE 6

Example 2

| Sn | 14 | 15 |
|---|---|---|
| KA | 1.0000000E+00 | 1.0000000E+00 |
| A3 | 0.0000000E+00 | 0.0000000E+00 |

TABLE 6-continued

Example 2

| Sn | 14 | 15 |
|---|---|---|
| A4 | −6.9197039E−06 | 6.5219336E−06 |
| A5 | 3.1529754E−07 | 4.0780655E−07 |
| A6 | −8.1246276E−09 | −4.3136424E−08 |
| A7 | −4.4927075E−09 | −6.4873191E−10 |
| A8 | 3.8362924E−10 | 3.0302497E−10 |
| A9 | 7.0468495E−12 | −5.2661685E−12 |
| A10 | −1.6779529E−12 | −1.1131712E−12 |

Example 3

Figure 6:
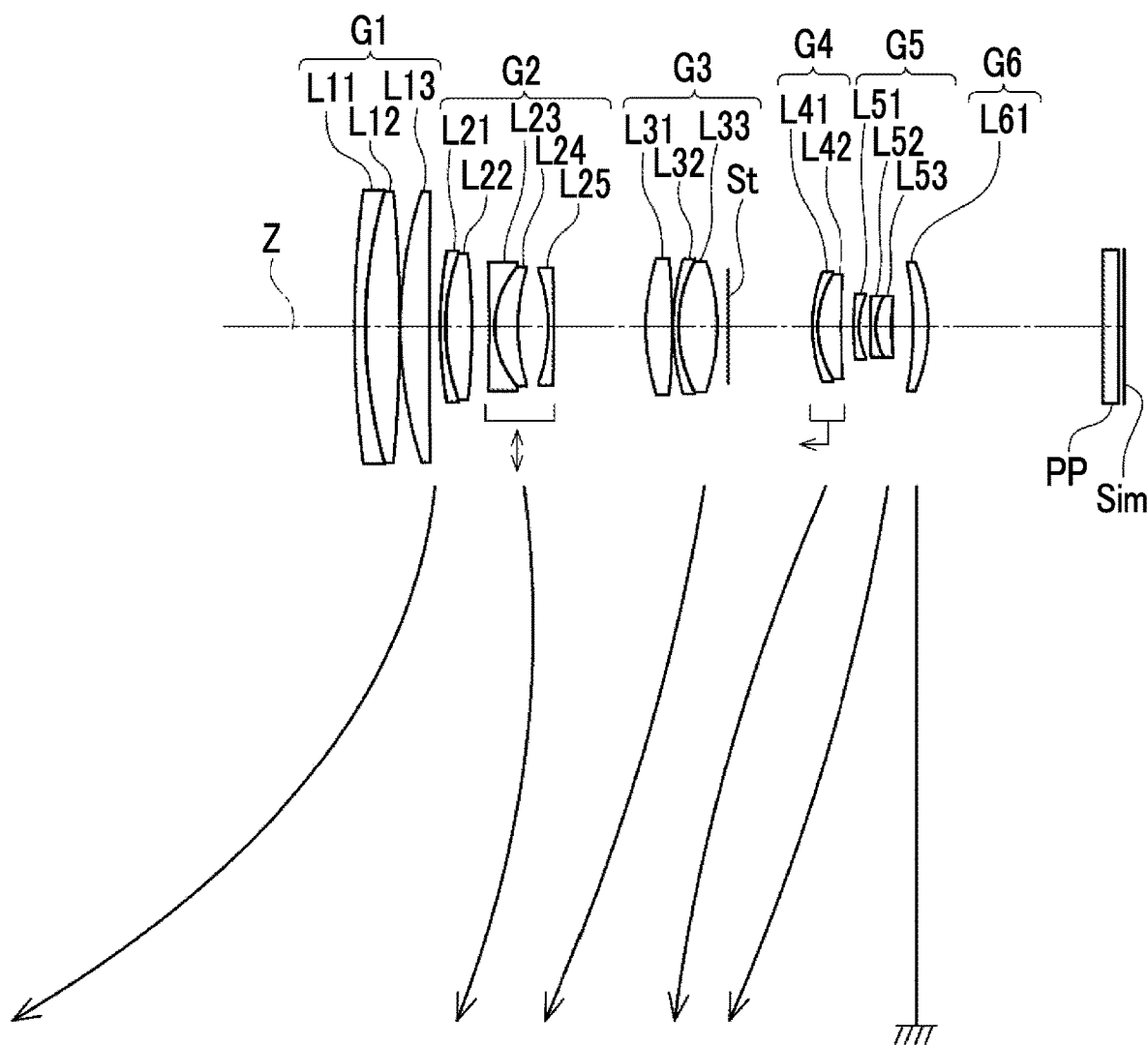
FIG. 6 is cross-sectional views showing a configuration of a zoom lens of Example 3 and a diagram showing movement loci thereof.
Figure 7:
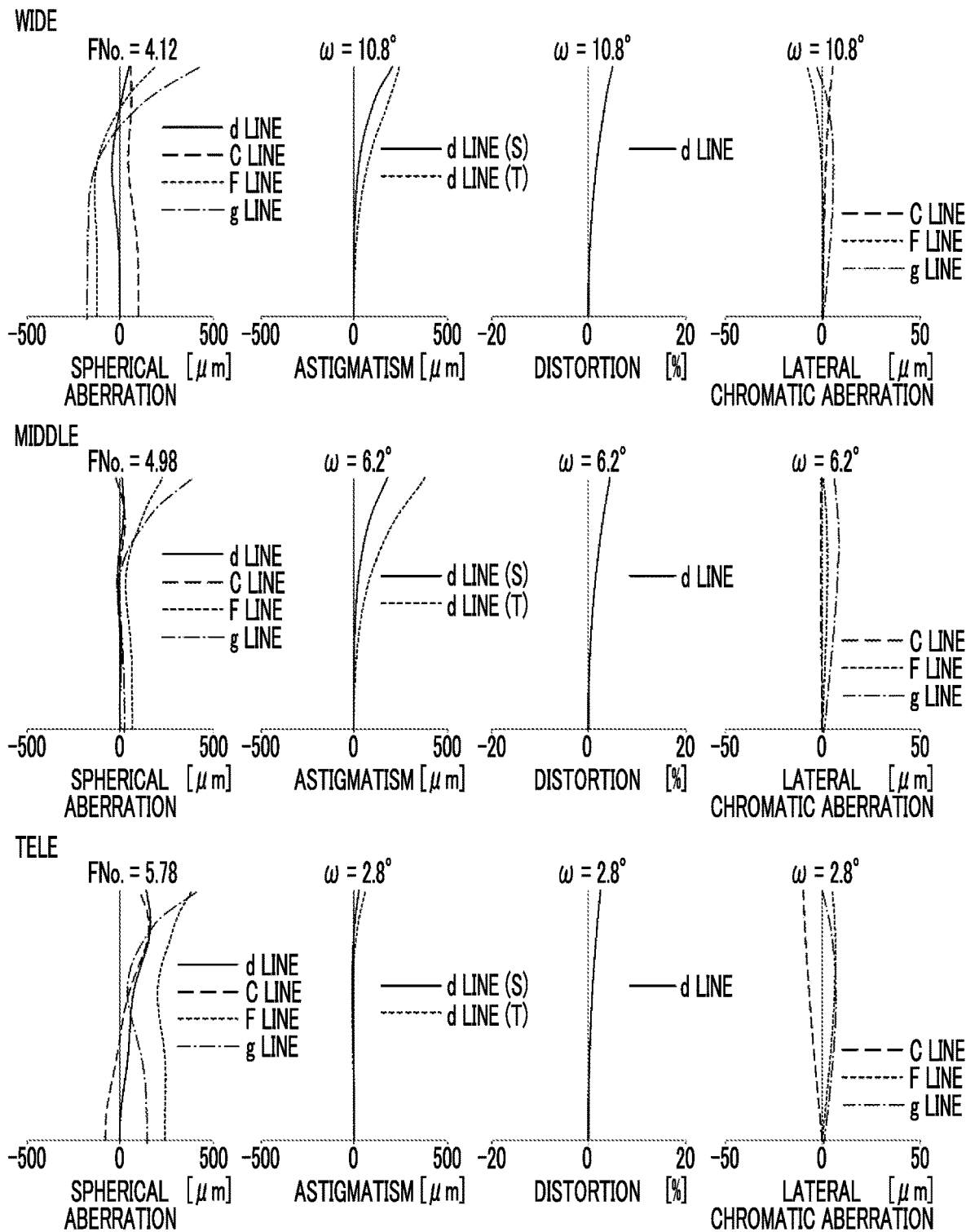
FIG. 7 is a diagram showing aberrations of the zoom lens of Example 3.

FIG. 6 shows a cross-sectional view of a configuration and movement loci of the zoom lens of Example 3. The zoom lens of Example 3 has the same configuration as the outline of the zoom lens of Example 1. Regarding the zoom lens of Example 3, Table 7 shows basic lens data, Table 8 shows specification and variable surface distances, and Table 9 shows aspheric surface coefficients thereof, and FIG. 7 shows aberration diagrams.

TABLE 7

Example 3

| Sn | R | D | Nd | νd | θgF | Material |
|---|---|---|---|---|---|---|
| 1 | 205.96933 | 2.000 | 1.83400 | 37.21 | 0.58082 | S-LAH60V.OHARA |
| 2 | 95.90276 | 6.186 | 1.41390 | 100.82 | 0.53373 | K-FIR100UV.SUMITA |
| 3 | −296.91414 | 0.150 | | | | |
| 4 | 84.46077 | 5.239 | 1.48749 | 70.44 | 0.53062 | FC5.HOYA |
| 5 | 1465.72203 | DD[5] | | | | |
| 6 | 82.14405 | 1.000 | 1.72916 | 54.68 | 0.54451 | S-LAL18.OHARA |
| 7 | 41.51553 | 4.802 | 1.51633 | 64.14 | 0.53531 | S-BSL7.OHARA |
| 8 | −124.10702 | 3.141 | | | | |
| 9 | −434.49905 | 1.010 | 1.80400 | 46.53 | 0.55775 | S-LAH65VS.OHARA |
| 10 | 17.30147 | 4.210 | 1.85896 | 22.73 | 0.62844 | S-NPH5.OHARA |
| 11 | 38.27414 | 5.521 | | | | |
| 12 | −32.13566 | 1.000 | 1.88300 | 40.76 | 0.56679 | S-LAH58.OHARA |
| 13 | −362.93028 | DD[13] | | | | |
| *14 | 38.56554 | 4.867 | 1.58313 | 59.38 | 0.54237 | L-BAL42.OHARA |
| *15 | −119.50546 | 0.150 | | | | |

TABLE 7-continued

Example 3

| Sn | R | D | Nd | νd | θgF | Material |
|---|---|---|---|---|---|---|
| 16 | 43.94432 | 1.000 | 1.85896 | 22.73 | 0.62844 | S-NPH5.OHARA |
| 17 | 27.23918 | 7.010 | 1.49700 | 81.54 | 0.53748 | S-FPL51.OHARA |
| 18 | −38.62218 | 2.000 | | | | |
| 19(St) | ∞ | DD[19] | | | | |
| 20 | 30.18637 | 1.000 | 1.88300 | 40.76 | 0.56679 | S-LAH58.OHARA |
| 21 | 18.57061 | 4.286 | 1.60738 | 56.82 | 0.54840 | S-BSM2.OHARA |
| 22 | 153.81266 | DD[22] | | | | |
| 23 | 66.80170 | 1.000 | 1.83481 | 42.74 | 0.56490 | S-LAH55VS.OHARA |
| 24 | 14.43231 | 2.038 | | | | |
| 25 | 164.75287 | 1.010 | 1.51633 | 64.14 | 0.53531 | S-BSL7.OHARA |
| 26 | 11.80971 | 2.847 | 1.63980 | 34.47 | 0.59233 | S-TIM27.OHARA |
| 27 | 50.56833 | DD[27] | | | | |
| 28 | −64.52682 | 2.765 | 1.58144 | 40.75 | 0.57757 | S-TIL25.OHARA |
| 29 | −31.51979 | 31.750 | | | | |
| 30 | ∞ | 2.850 | 1.54763 | 54.99 | 0.55229 | |
| 31 | ∞ | 1.145 | | | | |

TABLE 8

Example 3

| | WIDE | MIDDLE | TELE |
|---|---|---|---|
| Zr | 1.0 | 1.8 | 4.0 |
| f | 72.160 | 127.955 | 291.506 |
| FNo. | 4.12 | 4.98 | 5.78 |
| 2ω(°) | 21.6 | 12.4 | 5.6 |
| DD[5] | 2.000 | 26.468 | 68.605 |
| DD[13] | 16.662 | 7.543 | 1.871 |
| DD[19] | 15.339 | 8.629 | 16.096 |
| DD[22] | 2.345 | 9.055 | 1.588 |
| DD[27] | 3.932 | 15.801 | 33.218 |

TABLE 9

Example 3

| Sn | 14 | 15 |
|---|---|---|
| KA | 1.0000000E+00 | 1.0000000E+00 |
| A3 | 0.0000000E+00 | 0.0000000E+00 |
| A4 | −9.6452955E−06 | 3.8685591E−06 |
| A5 | 6.8850472E−07 | 7.2484683E−07 |
| A6 | −3.1230718E−08 | −5.4897280E−08 |
| A7 | −7.3584215E−09 | −4.1143453E−09 |
| A8 | 5.7249775E−10 | 4.7730917E−10 |
| A9 | 1.3541220E−11 | 4.0642451E−12 |
| A10 | −2.2228224E−12 | −1.6974458E−12 |

Example 4

Figure 8:
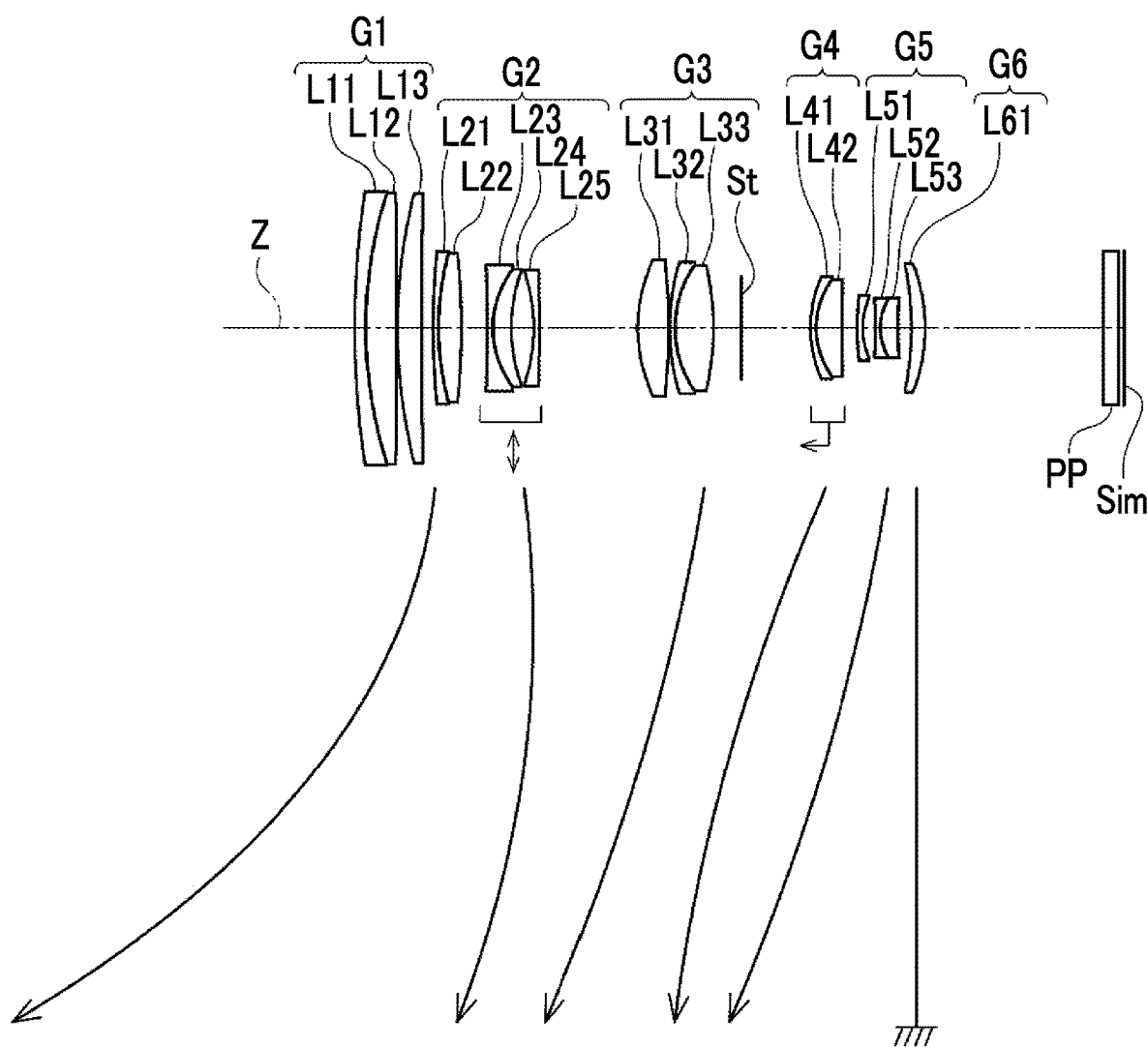
FIG. 8 is a cross-sectional view of a configuration of a zoom lens of Example 4 and a diagram showing movement loci thereof.
Figure 9:
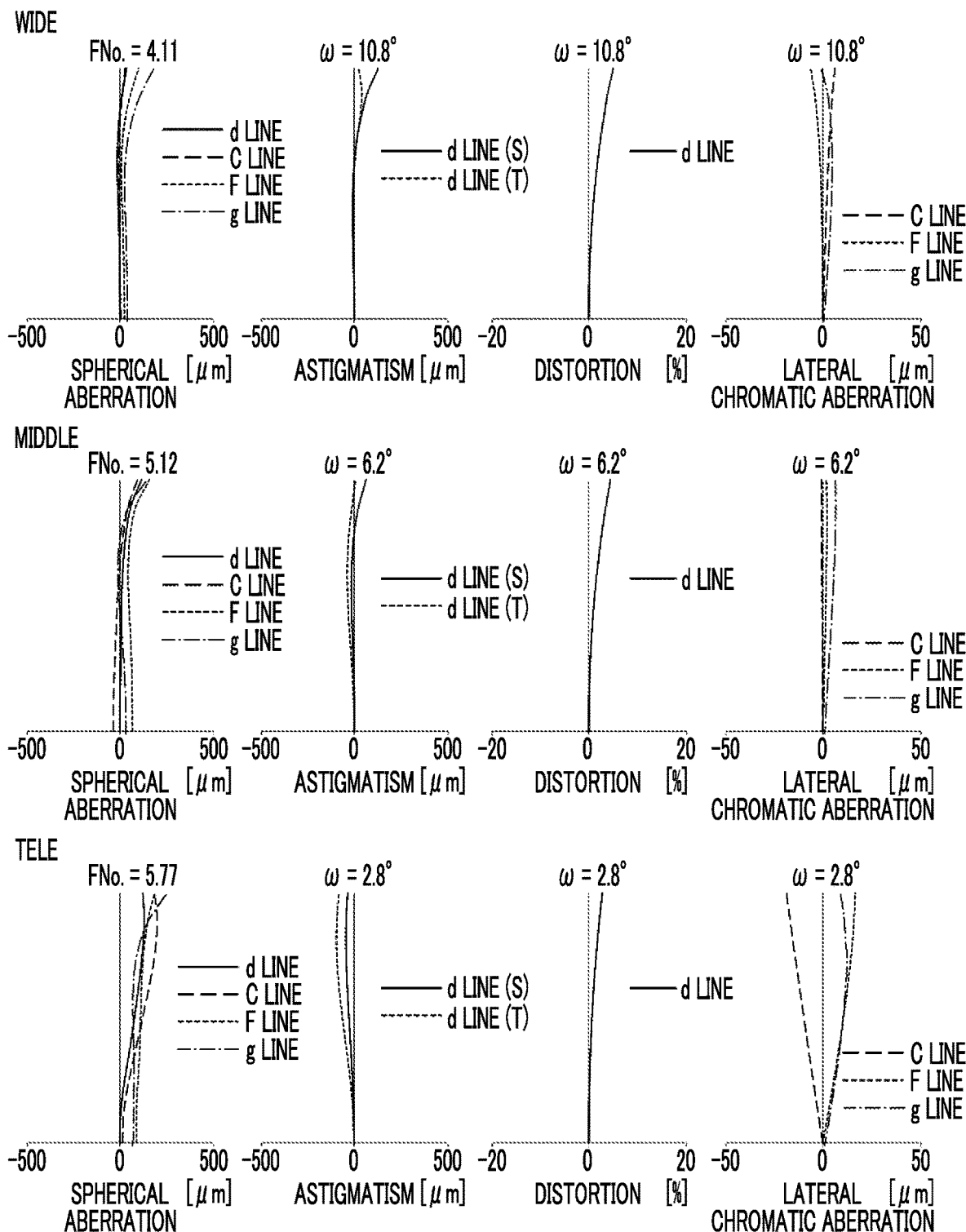
FIG. 9 is a diagram showing aberrations of the zoom lens of Example 4.

FIG. 8 shows a cross-sectional view of a configuration and movement loci of the zoom lens of Example 4. The zoom lens of Example 4 has the same configuration as the outline of the zoom lens of Example 1. Regarding the zoom lens of Example 4, Table 10 shows basic lens data, Table 11 shows specification and variable surface distances, and Table 12 shows aspheric surface coefficients thereof, and FIG. 9 shows aberration diagrams.

TABLE 10

Example 4

| Sn | R | D | Nd | νd | θgF | Material |
|---|---|---|---|---|---|---|
| 1 | 175.26117 | 2.000 | 1.67270 | 32.10 | 0.59891 | S-TIM25.OHARA |
| 2 | 85.06607 | 5.601 | 1.48749 | 70.44 | 0.53062 | FC5.HOYA |
| 3 | −2696.45183 | 0.150 | | | | |
| 4 | 103.84970 | 4.518 | 1.48749 | 70.44 | 0.53062 | FC5.HOYA |
| 5 | 3288.48649 | DD[5] | | | | |
| 6 | 139.33500 | 1.000 | 1.51633 | 64.14 | 0.53531 | S-BSL7.OHARA |
| 7 | 53.34289 | 4.168 | 1.59282 | 68.62 | 0.54414 | FCD515.HOYA |
| 8 | −138.85038 | 4.725 | | | | |
| 9 | −338.78830 | 1.010 | 1.75500 | 52.32 | 0.54757 | S-LAH97.OHARA |
| 10 | 18.49718 | 3.388 | 1.85896 | 22.73 | 0.62844 | S-NPH5.OHARA |
| 11 | 33.26072 | 4.092 | | | | |
| 12 | −32.57949 | 1.000 | 1.83481 | 42.74 | 0.56490 | S-LAH55VS.OHARA |
| 13 | −617.14849 | DD[13] | | | | |
| *14 | 29.88691 | 5.667 | 1.49710 | 81.56 | 0.53848 | M-FCD1.HOYA |
| *15 | −94.36738 | 0.150 | | | | |
| 16 | 43.56314 | 1.000 | 1.83400 | 37.21 | 0.58082 | S-LAH60V.OHARA |
| 17 | 21.30614 | 7.010 | 1.49700 | 81.54 | 0.53748 | S-FPL51.OHARA |
| 18 | −52.27336 | 5.107 | | | | |
| 19(St) | ∞ | DD[19] | | | | |
| 20 | 24.80187 | 1.000 | 1.85896 | 22.73 | 0.62844 | S-NPH5.OHARA |
| 21 | 15.47758 | 4.853 | 1.62004 | 36.26 | 0.58800 | S-TIM2.OHARA |
| 22 | 604.58203 | DD[22] | | | | |

TABLE 10-continued

Example 4

| Sn | R | D | Nd | νd | θgF | Material |
|---|---|---|---|---|---|---|
| 23 | 59.46758 | 1.000 | 1.85150 | 40.78 | 0.56958 | S-LAH89.OHARA |
| 24 | 14.54075 | 2.230 | | | | |
| 25 | −377.81871 | 1.000 | 1.51633 | 64.14 | 0.53531 | S-BSL7.OHARA |
| 26 | 10.92511 | 3.169 | 1.58144 | 40.75 | 0.57757 | S-TIL25.OHARA |
| 27 | 71.97016 | DD[27] | | | | |
| 28 | −61.70062 | 2.505 | 1.71736 | 29.52 | 0.60483 | S-TIH1.OHARA |
| 29 | −33.29000 | 32.417 | | | | |
| 30 | ∞ | 2.850 | 1.54763 | 54.99 | 0.55229 | |
| 31 | ∞ | 1.083 | | | | |

TABLE 11

Example 4

| | WIDE | MIDDLE | TELE |
|---|---|---|---|
| Zr | 1.0 | 1.8 | 4.0 |
| f | 72.094 | 127.837 | 291.237 |
| FNo. | 4.11 | 5.12 | 5.77 |
| 2ω(°) | 21.6 | 12.4 | 5.6 |
| DD[5] | 2.000 | 20.536 | 69.246 |
| DD[13] | 17.857 | 5.119 | 1.556 |
| DD[19] | 12.579 | 5.998 | 13.672 |
| DD[22] | 2.762 | 9.343 | 1.669 |
| DD[27] | 2.467 | 14.070 | 32.676 |

TABLE 12

Example 4

| Sn | 14 | 15 |
|---|---|---|
| KA | 1.0000000E+00 | 1.0000000E+00 |
| A3 | 0.0000000E+00 | 0.0000000E+00 |
| A4 | −4.0329397E−06 | 8.7484339E−06 |
| A5 | −2.9946250E−07 | −1.8228946E−07 |
| A6 | 2.0050489E−08 | −8.8408156E−09 |
| A7 | 3.3709556E−09 | 5.6925400E−09 |
| A8 | −2.8068678E−10 | −2.9622932E−10 |
| A9 | −7.6798252E−12 | −1.5999050E−11 |
| A10 | 9.1678054E−13 | 1.2516046E−12 |

Example 5

Figure 10:
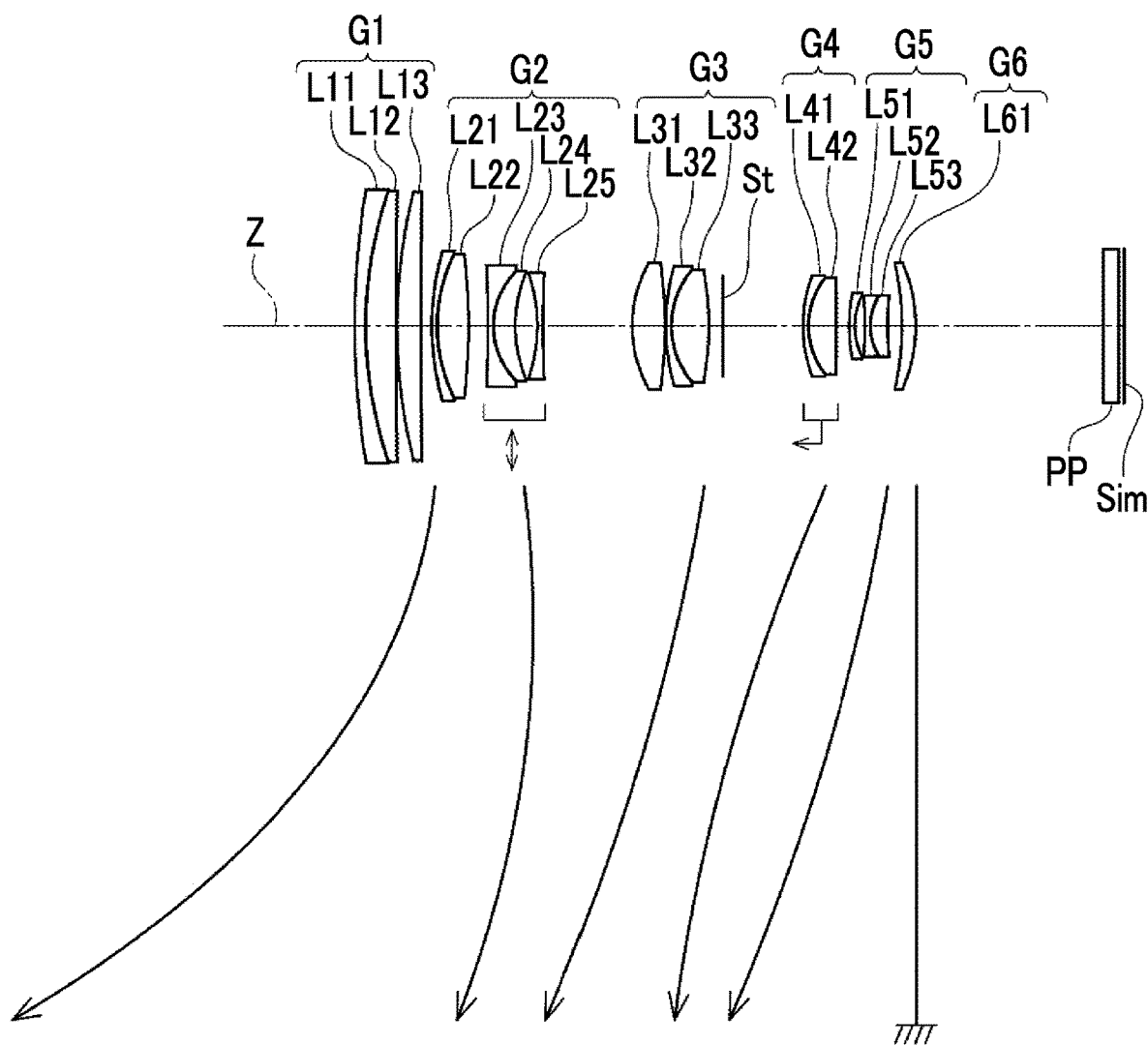
FIG. 10 is a cross-sectional view of a configuration of a zoom lens of Example 5 and a diagram showing movement loci thereof.
Figure 11:
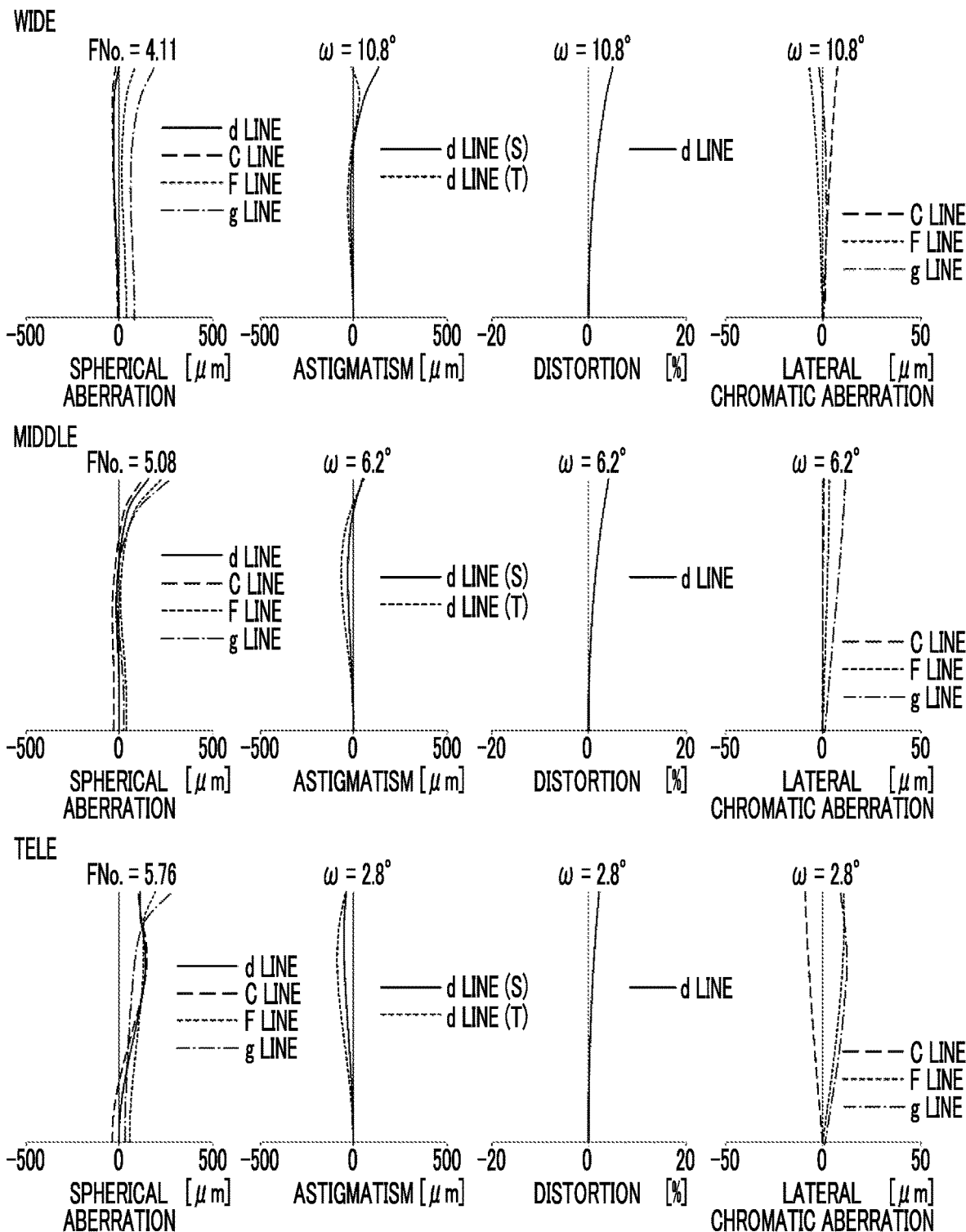
FIG. 11 is a diagram showing aberrations of the zoom lens of Example 5.

FIG. 10 shows a cross-sectional view of a configuration and movement loci of the zoom lens of Example 5. The zoom lens of Example 5 has the same configuration as the outline of the zoom lens of Example 1. Regarding the zoom lens of Example 5, Table 13 shows basic lens data, Table 14 shows specification and variable surface distances, and Table 15 shows aspheric surface coefficients thereof, and FIG. 11 shows aberration diagrams.

TABLE 13

Example 5

| Sn | R | D | Nd | νd | θgF | Material |
|---|---|---|---|---|---|---|
| 1 | 162.71535 | 2.000 | 1.72047 | 34.71 | 0.58350 | S-NBH8.OHARA |
| 2 | 80.30418 | 5.525 | 1.52841 | 76.45 | 0.53954 | S-FPM4.OHARA |
| 3 | 1732.34393 | 0.150 | | | | |
| 4 | 105.60710 | 4.367 | 1.52841 | 76.45 | 0.53954 | S-FPM4.OHARA |
| 5 | 1833.98806 | DD[5] | | | | |
| 6 | 50.96451 | 1.000 | 1.63854 | 55.38 | 0.54858 | S-BSM18.OHARA |
| 7 | 31.27733 | 5.703 | 1.54072 | 47.23 | 0.56511 | S-TIL2.OHARA |
| 8 | −116.40591 | 3.513 | | | | |
| 9 | −334.05327 | 1.010 | 1.72916 | 54.68 | 0.54451 | S-LAL18.OHARA |
| 10 | 14.69540 | 4.019 | 1.85025 | 30.05 | 0.59797 | S-NBH57.OHARA |
| 11 | 27.08350 | 4.020 | | | | |
| 12 | −30.28650 | 1.000 | 1.88300 | 40.76 | 0.56679 | S-LAH58.OHARA |
| 13 | 242.48499 | DD[13] | | | | |
| *14 | 24.28616 | 6.000 | 1.49710 | 81.56 | 0.53848 | M-FCD1.HOYA |
| *15 | −71.65630 | 0.150 | | | | |
| 16 | 44.41795 | 1.000 | 1.83481 | 42.74 | 0.56490 | S-LAH55VS.OHARA |
| 17 | 16.64892 | 6.828 | 1.49700 | 81.54 | 0.53748 | S-FPL51.OHARA |
| 18 | −60.14473 | 2.550 | | | | |
| 19(St) | ∞ | DD[19] | | | | |
| 20 | 27.55884 | 1.000 | 1.85025 | 30.05 | 0.59797 | S-NBH57.OHARA |
| 21 | 15.02960 | 5.101 | 1.74400 | 44.79 | 0.56560 | S-LAM2.OHARA |
| 22 | −729.00902 | DD[22] | | | | |
| 23 | 36.86908 | 1.000 | 1.83481 | 42.74 | 0.56490 | S-LAH55VS.OHARA |
| 24 | 13.35164 | 1.811 | | | | |
| 25 | −97.63465 | 1.000 | 1.49700 | 81.54 | 0.53748 | S-FPL51.OHARA |
| 26 | 10.77446 | 3.188 | 1.56732 | 42.82 | 0.57309 | S-TIL26.OHARA |
| 27 | 67.61985 | DD[27] | | | | |
| 28 | −53.76551 | 2.515 | 1.63980 | 34.47 | 0.59233 | S-TIM27.OHARA |
| 29 | −30.39235 | 34.157 | | | | |

TABLE 13-continued

Example 5

| Sn | R | D | Nd | vd | θgF | Material |
|---|---|---|---|---|---|---|
| 30 | ∞ | 2.850 | 1.54763 | 54.99 | 0.55229 | |
| 31 | ∞ | 1.073 | | | | |

TABLE 14

Example 5

| | WIDE | MIDDLE | TELE |
|---|---|---|---|
| Zr | 1.0 | 1.8 | 4.0 |
| f | 72.089 | 127.828 | 291.216 |
| FNo. | 4.11 | 5.08 | 5.76 |
| 2ω(°) | 21.6 | 12.4 | 5.6 |
| DD[5] | 1.999 | 19.042 | 67.176 |
| DD[13] | 16.215 | 4.357 | 1.434 |
| DD[19] | 14.635 | 8.753 | 15.415 |
| DD[22] | 2.460 | 8.342 | 1.680 |
| DD[27] | 2.587 | 13.994 | 33.312 |

TABLE 15

Example 5

| Sn | 14 | 15 |
|---|---|---|
| KA | 1.0000000E+00 | 1.0000000E+00 |
| A3 | 0.0000000E+00 | 0.0000000E+00 |
| A4 | −3.8101959E−06 | 1.2057187E−05 |
| A5 | −7.4330052E−07 | −6.1289249E−07 |
| A6 | 4.7764585E−08 | 9.5544449E−09 |
| A7 | 8.2871442E−09 | 1.2023483E−08 |
| A8 | −7.1276120E−10 | −7.8739197E−10 |
| A9 | −2.2376391E−11 | −3.7131956E−11 |
| A10 | 2.6543103E−12 | 3.4558207E−12 |

Example 6

Figure 12:
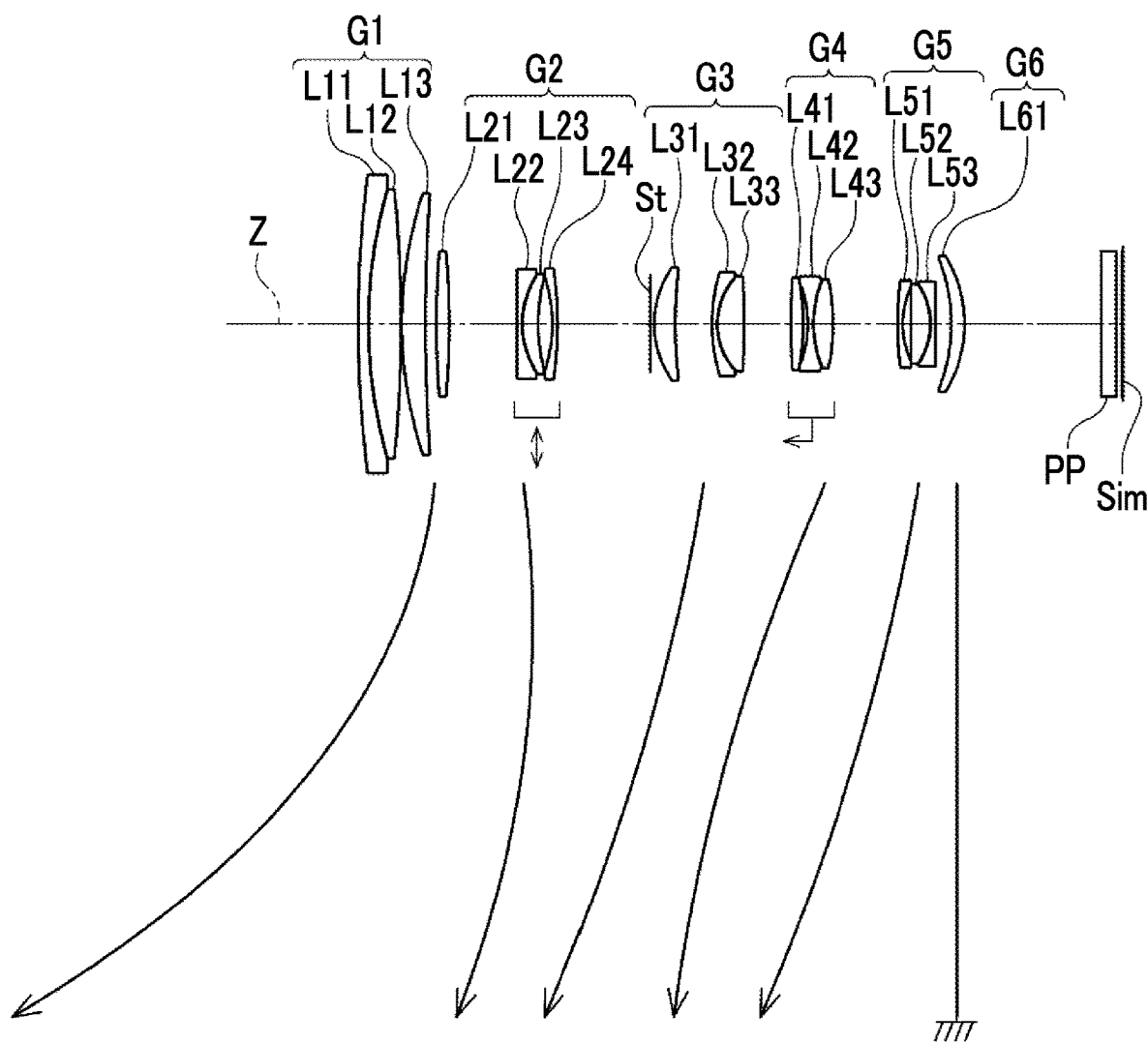
FIG. 12 is a cross-sectional view of a configuration of a zoom lens of Example 6 and a diagram showing movement loci thereof.
Figure 13:
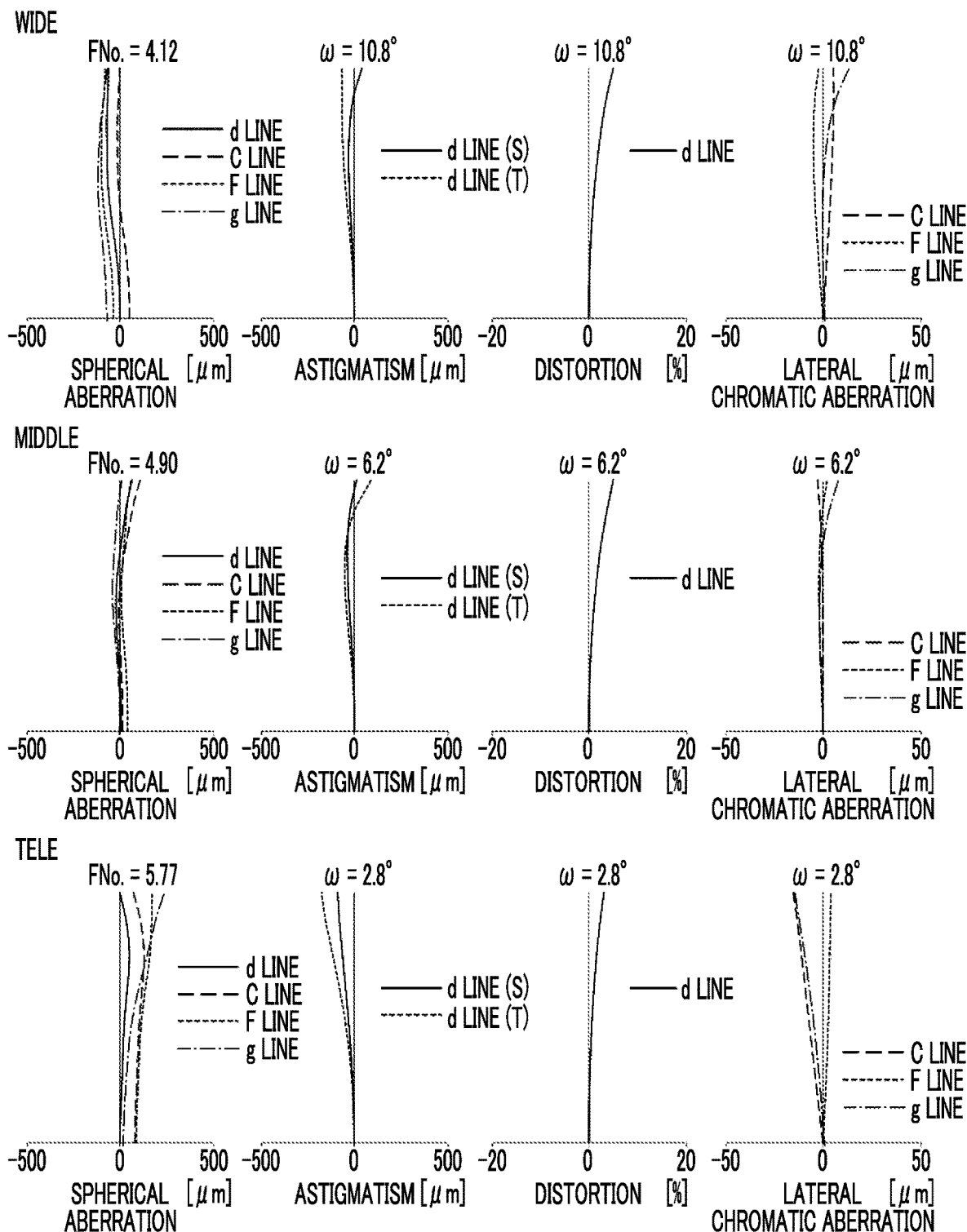
FIG. 13 is a diagram of aberrations of the zoom lens of Example 6 of the present disclosure.
Figure 14:
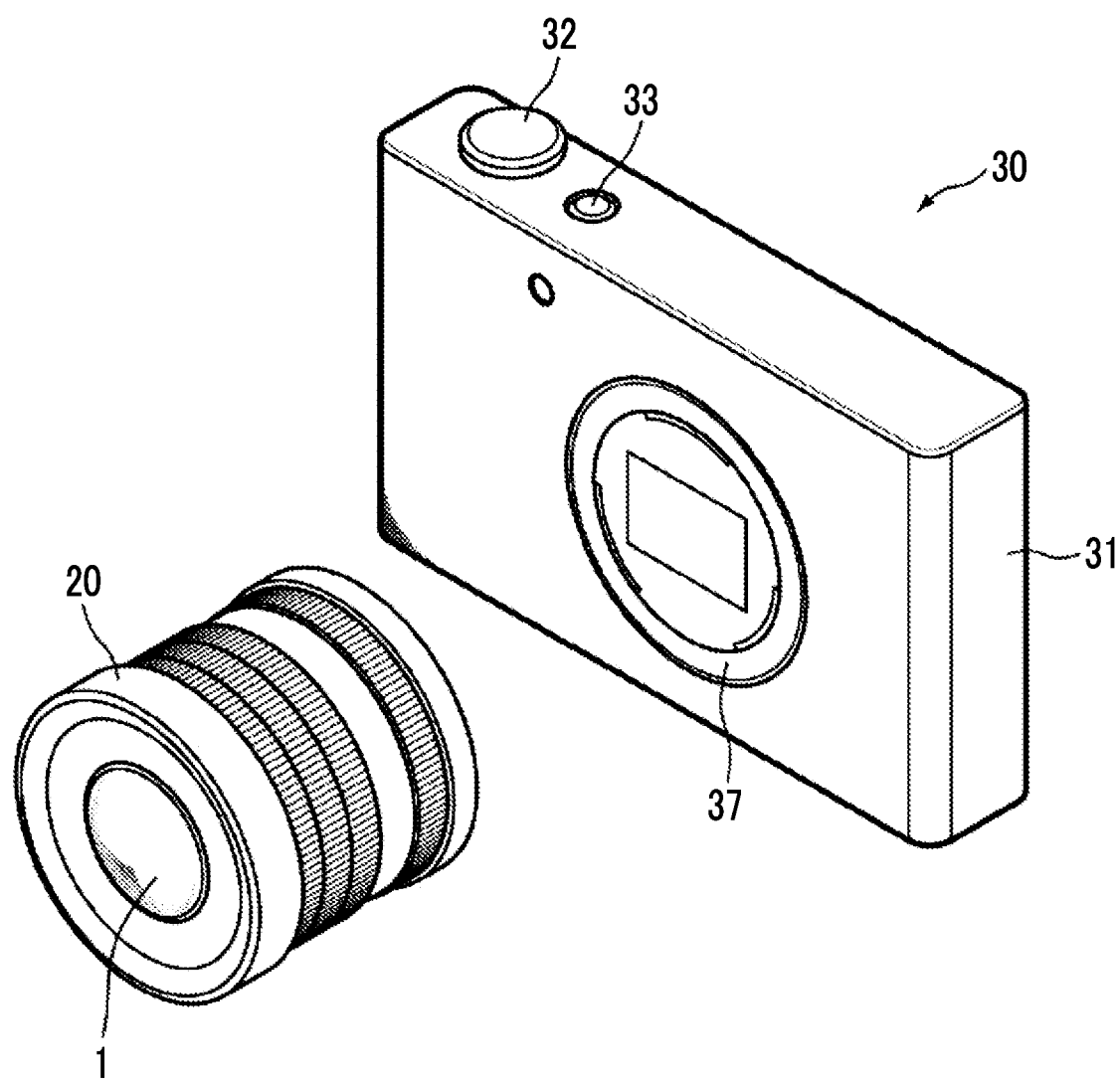
FIG. 14 is a perspective view of the front side of an imaging apparatus according to an embodiment.

FIG. 12 shows a cross-sectional view of a configuration and movement loci of the zoom lens of Example 6. The zoom lens of Example 6 has the same configuration as the outline of the zoom lens of Embodiment 1 except for the following points: the second lens group G2 consists of four lenses L21 to L24 in order from the object side to the image side; the third lens group G3 consists of the aperture stop St and the three lenses L31 to L33 in order from the object side to the image side; the fourth lens group G4 consists of the three lenses L41 to L43 in order from the object side to the image side; and the image stabilization lens group consists of the three lenses L22 to L24. Regarding the zoom lens of Example 6, Table 16 shows basic lens data, Table 17 shows specification and variable surface distances, and Table 18 shows aspheric surface coefficients thereof, and FIG. 13 shows aberration diagrams.

TABLE 16

Example 6

| Sn | R | D | Nd | vd | θgF | Material |
|---|---|---|---|---|---|---|
| 1 | 245.94174 | 2.000 | 1.80610 | 33.27 | 0.58845 | NBFD15-W.HOYA |
| 2 | 100.00800 | 6.240 | 1.48749 | 70.42 | 0.53039 | H-QK3L.CDGM |
| 3 | −278.46212 | 0.150 | | | | |
| 4 | 84.82221 | 4.540 | 1.49700 | 81.59 | 0.53701 | H-FK61.CDGM |
| 5 | 399.21233 | DD[5] | | | | |
| 6 | 179.72328 | 2.470 | 1.48749 | 70.42 | 0.53039 | H-QK3L.CDGM |
| 7 | −179.72328 | 13.056 | | | | |
| 8 | ∞ | 1.010 | 1.83481 | 42.74 | 0.56490 | S-LAH55VS.OHARA |
| 9 | 18.29540 | 3.090 | 1.89286 | 20.36 | 0.63944 | S-NPH4.OHARA |
| 10 | 38.00289 | 2.677 | | | | |
| 11 | −31.54978 | 1.000 | 1.91082 | 35.25 | 0.58224 | TAFD35.HOYA |
| 12 | −88.17798 | DD[12] | | | | |
| 13 | ∞ | 0.750 | | | | |
| *14 | 20.14224 | 4.040 | 1.58313 | 59.38 | 0.54237 | L-BAL42.OHARA |
| *15 | 100.95599 | 7.084 | | | | |
| 16 | 37.52682 | 1.000 | 1.88300 | 39.22 | 0.57295 | H-ZLAF68N.CDGM |
| 17 | 14.21410 | 5.140 | 1.49700 | 81.59 | 0.53701 | H-FK61.CDGM |
| 18 | −229.03631 | DD[18] | | | | |
| 19(St) | 142.71745 | 2.370 | 1.78800 | 47.37 | 0.55598 | S-LAH64.OHARA |
| 20 | −49.04258 | 0.846 | | | | |
| 21 | −23.69230 | 1.120 | 1.63980 | 34.47 | 0.59233 | S-TIM27.OHARA |
| 22 | 23.69230 | 3.760 | 1.87070 | 40.73 | 0.56825 | TAFD32.HOYA |
| 23 | −46.00978 | DD[23] | | | | |
| 24 | 71.77426 | 1.000 | 1.74100 | 52.64 | 0.54676 | S-LAL61.OHARA |
| 25 | 18.58085 | 1.552 | | | | |
| 26 | 399.50103 | 3.760 | 1.64769 | 33.79 | 0.59393 | S-TIM22.OHARA |
| 27 | −14.60490 | 1.010 | 1.78800 | 47.37 | 0.55598 | S-LAH64.OHARA |
| 28 | ∞ | DD[28] | | | | |
| 29 | −37.23339 | 2.590 | 1.91082 | 35.25 | 0.58224 | TAFD35.HOYA |
| 30 | −26.66311 | 26.284 | | | | |

TABLE 16-continued

Example 6

| Sn | R | D | Nd | νd | θgF | Material |
|---|---|---|---|---|---|---|
| 31 | ∞ | 2.850 | 1.54763 | 54.98 | 0.55247 | |
| 32 | ∞ | 1.123 | | | | |

TABLE 17

Example 6

| | WIDE | MIDDLE | TELE |
|---|---|---|---|
| Zr | 1.0 | 1.8 | 4.0 |
| f | 72.053 | 127.769 | 291.097 |
| FNo. | 4.12 | 4.90 | 5.77 |
| 2ω(°) | 21.6 | 12.4 | 5.6 |
| DD[5] | 2.108 | 35.699 | 72.334 |
| DD[13] | 17.824 | 9.810 | 1.870 |
| DD[19] | 9.041 | 9.390 | 19.307 |
| DD[22] | 12.554 | 12.205 | 2.288 |
| DD[27] | 2.978 | 9.994 | 21.689 |

TABLE 18

Example 6

| Sn | 14 | 15 |
|---|---|---|
| KA | 1.0000000E+00 | 1.0000000E+00 |
| A3 | 0.0000000E+00 | 0.0000000E+00 |
| A4 | −1.6557317E−06 | 8.5826551E−06 |
| A5 | −8.7163585E−07 | −1.0801504E−06 |
| A6 | 2.3497768E−07 | 2.9070569E−07 |
| A7 | −3.3880102E−08 | −4.3057170E−08 |
| A8 | 2.0590459E−09 | 3.2719258E−09 |
| A9 | 7.5024950E−12 | −9.0431876E−11 |
| A10 | −5.2428804E−12 | −2.1725090E−12 |

Table 19 shows values corresponding to Conditional Expressions (1) to (40) of the zoom lenses of Examples 1 to 6.

TABLE 19

| Expression Number | Conditional Expression | Example 1 | Example 2 | Example 3 | Example 4 | Example 5 | Example 6 |
|---|---|---|---|---|---|---|---|
| (1) | f3/f4 | 0.399 | 0.392 | 0.300 | 0.569 | 0.768 | 1.006 |
| (2) | f2/f4 | −0.409 | −0.403 | 0.296 | 0.540 | −0.672 | −0.760 |
| (3) | f2/f1 | −0.190 | −0.185 | −0.177 | −0.185 | −0.173 | −0.214 |
| (4) | f5/f4 | −0.306 | −0.299 | −0.244 | −0.384 | −0.527 | −0.602 |
| (5) | f6/f1 | 0.644 | 0.625 | 0.669 | 0.617 | 0.672 | 0.597 |
| (6) | {(Xt1-Xw1)-(Xt2-Xw2)}/f1 | 0.424 | 0.422 | 0.433 | 0.427 | 0.418 | 0.454 |
| (7) | Db35/f4 | 0.322 | 0.313 | 0.272 | 0.488 | 0.639 | 0.683 |
| (8) | D3f5r/T4 | 7.774 | 8.286 | 8.493 | 8.120 | 7.658 | 6.704 |
| (9) | f31/f3 | 1.965 | 1.816 | 1.841 | 1.510 | 1.205 | 0.970 |
| (10) | ν31 | 64.06 | 64.06 | 59.38 | 81.56 | 81.56 | 59.38 |
| (11) | ν 1pave | 70.44 | 85.63 | 85.63 | 70.44 | 76.45 | 76.01 |
| (12) | β 4t/β 4w | 1.00 | 0.98 | 0.99 | 0.99 | 0.96 | 1.75 |
| (13) | β 2t/β 2w | 2.80 | 2.77 | 2.78 | 2.81 | 2.80 | 4.26 |
| (14) | β 3t/β 3w | 1.06 | 1.09 | 1.09 | 1.06 | 1.10 | 0.43 |
| (15) | (β 2t/β 2w)/(β 3t/β 3w) | 2.63 | 2.53 | 2.55 | 2.65 | 2.56 | 9.90 |
| (16) | (β 3t/β 3w)/(β 4t/β 4w) | 1.07 | 1.11 | 1.10 | 1.07 | 1.14 | 0.25 |
| (17) | $(1-\beta 4w^2) \times \beta 4Rw^2$ | 3.44 | 3.40 | 2.90 | 4.56 | 5.64 | 3.76 |
| (18) | $(1-\beta 4t^2) \times \beta 4Rt^2$ | 6.41 | 6.41 | 5.48 | 8.64 | 10.72 | 5.07 |
| (19) | $\{(1-\beta 4t^2) \times \beta 4Rt^2\}/\{(1-\beta 4w^2) \times \beta 4Rw^2\}$ | 1.86 | 1.88 | 1.89 | 1.89 | 1.90 | 1.35 |
| (20) | (1-β isw) × β isRw | −2.74 | −2.73 | −2.81 | −2.73 | −3.14 | −2.13 |
| (21) | (1-β isw) × β isRt | −5.70 | −5.67 | 5.70 | −5.62 | −6.50 | −3.90 |
| (22) | {(1-β ist) × β isRt}/{(1-β isw) × β isRw} | 2.08 | 2.08 | 2.03 | 2.05 | 2.07 | 1.83 |
| (23) | θ 1n-θ 1p | 0.0516 | 0.0602 | 0.0486 | 0.0683 | 0.0440 | 0.0548 |
| (24) | θ 12n-θ 12p | 0.0092 | 0.0131 | 0.0054 | 0.0032 | 0.0003 | 0.0192 |
| (25) | N1n-N1p | 0.4233 | 0.1523 | 0.4201 | 0.1852 | 0.1921 | 0.3186 |
| (26) | ν1p-ν 1n | 35.19 | 35.97 | 63.61 | 38.34 | 41.74 | 37.15 |
| (27) | N3n-N3p | 0.2204 | 0.1919 | 0.3620 | 0.3370 | 0.3378 | 0.3860 |
| (28) | ν 3p-ν 3n | 52.02 | 50.47 | 58.81 | 44.33 | 38.80 | 42.37 |
| (29) | fw/f1 | 0.448 | 0.441 | 0.470 | 0.458 | 0.462 | 0.466 |
| (30) | fw/f2 | −2.362 | −2.384 | −2.657 | −2.474 | −2.664 | −2.181 |
| (31) | fw/f3 | 2.419 | 2.451 | 2.627 | 2.349 | 2.331 | 1.649 |
| (32) | fw/f4 | 0.966 | 0.961 | 0.787 | 1.337 | 1.790 | 1.658 |
| (33) | fw/f5 | −3.159 | −3.209 | −3.223 | −3.481 | −3.401 | −2.754 |
| (34) | fw/f6 | 0.696 | 0.706 | 0.702 | 0.742 | 0.688 | 0.780 |
| (35) | ft/f1 | 1.811 | 1.782 | 1.897 | 1.849 | 1.866 | 1.883 |
| (36) | ft/f2 | −9.543 | −9.629 | −10.735 | −9.995 | −10.763 | −8.811 |
| (37) | ft/f3 | 9.772 | 9.902 | 10.611 | 9.489 | 9.418 | 6.662 |
| (38) | ft/f4 | 3.903 | 3.880 | 3.180 | 5.399 | 7.233 | 6.698 |
| (39) | ft/f5 | −12.763 | −12.965 | 13.019 | −14.061 | −13.738 | −11.127 |
| (40) | ft/f6 | 2.811 | 2.851 | 2.836 | 2.997 | 2.778 | 3.152 |

As can be seen from the above data, the zoom lenses of Examples 1 to 6 each are configured to have a small size and have favorable optical performance by satisfactorily correcting various aberrations even though the zoom ratio is 4 or more. Further, the zoom lenses of Examples 1 to 6 each have a long focal length at the telephoto end and each are suitable as a telephoto zoom lens.

Figure 15:
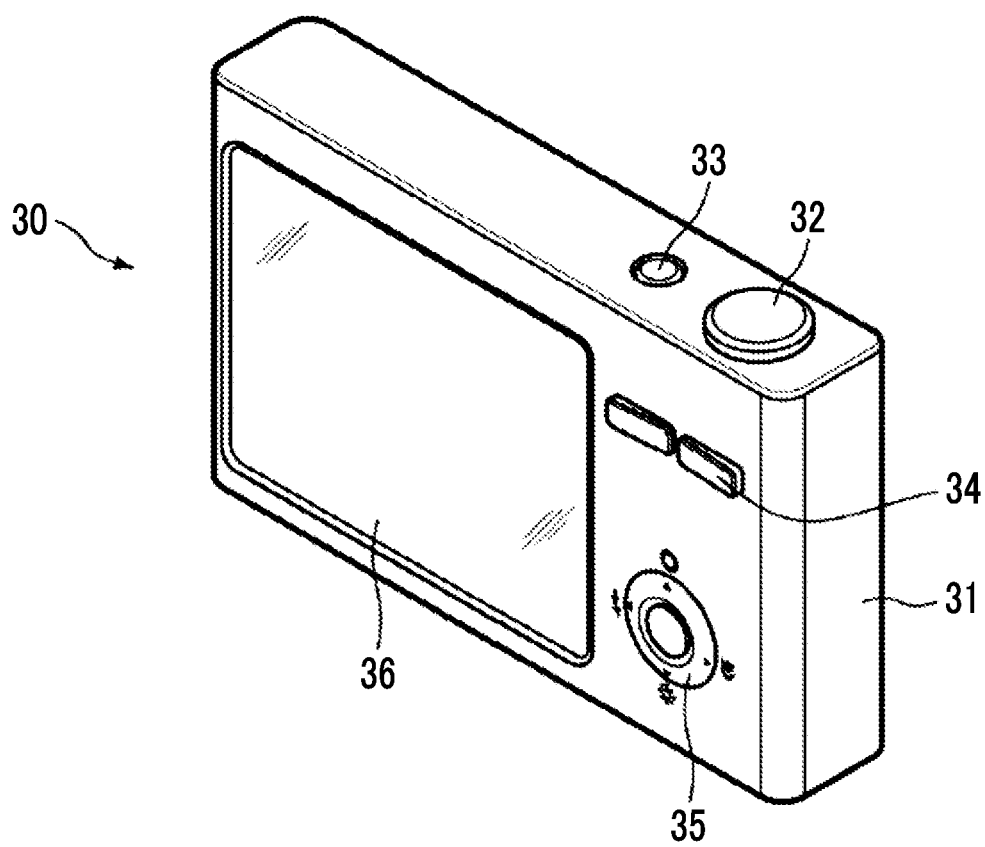
FIG. 15 is a perspective view of the rear side of the imaging apparatus according to the embodiment.

Next, an imaging apparatus according to an embodiment of the present disclosure will be described. FIGS. 15 and 16 are external views of a camera 30 which is the imaging apparatus according to the embodiment of the present disclosure. FIG. 15 is a perspective view of the camera 30 viewed from the front side, and FIG. 16 is a perspective view of the camera 30 viewed from the rear side. The camera 30 is a so-called mirrorless type digital camera, and the interchangeable lens 20 can be detachably attached thereto. The interchangeable lens 20 is configured to include the zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. A zoom lens consisting of, in order from an object side to an image side:
   a first lens group having a positive refractive power; a second lens group having a negative refractive power; a third lens group having a positive refractive power; a fourth lens group having a positive refractive power; a fifth lens group having a negative refractive power; and a sixth lens group having a positive refractive power,
   wherein during zooming from a wide angle end to a telephoto end, the third lens group and the fifth lens group move integrally along an optical axis and distances between adjacent lens groups in an optical axis direction change, and
   assuming that
   a focal length of the sixth lens group is f6, and
   a focal length of the first lens group is f1,
   Conditional Expression (5) is satisfied, which is represented by $$0.25 < f6/f1 < 1 \tag{5}$$

2. The zoom lens according to claim 1, wherein the fourth lens group moves during focusing.

3. The zoom lens according to claim 1, wherein assuming that
   a focal length of the third lens group is f3, and
   a focal length of the fourth lens group is f4,
   Conditional Expression (1) is satisfied, which is represented by $$0.12 < f3/f4 < 1.24 \tag{1}$$

4. The zoom lens according to claim 1, wherein assuming that
   a focal length of the second lens group is f2, and
   a focal length of the fourth lens group is f4,
   Conditional Expression (2) is satisfied, which is represented by $$-1 < f2/f4 < -0.12 \tag{2}$$

5. The zoom lens according to claim 1, wherein assuming that
   a focal length of the second lens group is f2, and
   a focal length of the first lens group is f1,
   Conditional Expression (3) is satisfied, which is represented by $$-0.3 < f2/f1 < -0.07 \tag{3}$$

6. The zoom lens according to claim 1, wherein assuming that
   a focal length of the fifth lens group is f5, and
   a focal length of the fourth lens group is f4,
   Conditional Expression (4) is satisfied, which is represented by $$-0.79 < f5/f4 < -0.1 \tag{4}$$

7. The zoom lens according to claim 1, wherein assuming that
   a distance on the optical axis from a lens surface closest to the object side in the first lens group to an image plane at the telephoto end is Xt1,
   a distance on the optical axis from the lens surface closest to the object side in the first lens group to the image plane at the wide angle end is Xw1,
   a distance on the optical axis from a lens surface closest to the object side in the second lens group to the image plane at the telephoto end is Xt2,
   a distance on the optical axis from the lens surface closest to the object side in the second lens group to the image plane at the wide angle end is Xw2, and
   a focal length of the first lens group is f1,
   Conditional Expression (6) is satisfied, which is represented by $$0.35 < \{(Xt1-Xw1)-(Xt2-Xw2)\}/f1 < 0.55 \tag{6}$$

8. The zoom lens according to claim 1, wherein assuming that a distance on the optical axis from a lens surface closest to the image side in the third lens group to a lens surface closest to the object side in the fifth lens group is Db35, and a focal length of the fourth lens group is f4, Conditional Expression (7) is satisfied, which is represented by $$0.11 < Db35/f4 < 0.96 \qquad (7).$$

9. The zoom lens according to claim 1, wherein assuming that a distance on the optical axis from a lens surface closest to the object side in the third lens group to a lens surface closest to the image side in the fifth lens group is D3f5r, and a distance on the optical axis from a lens surface closest to the object side in the fourth lens group to a lens surface closest to the image side in the fourth lens group is T4, Conditional Expression (8) is satisfied, which is represented by $$3.06 < D3f5r/T4 < 12.74 \qquad (8).$$

10. The zoom lens according to claim 1, wherein the third lens group includes a positive lens closest to the object side, and assuming that a focal length of the positive lens closest to the object side in the third lens group is f31, and a focal length of the third lens group is f3, Conditional Expression (9) is satisfied, which is represented by $$0.5 < f31/f3 < 2.8 \qquad (9).$$

11. The zoom lens according to claim 1, wherein the third lens group includes a positive lens closest to the object side, and assuming that an Abbe number of the positive lens closest to the object side in the third lens group based on a d line is v31, Conditional Expression (10) is satisfied, which is represented by $$45 < v31 < 97 \qquad (10).$$

12. The zoom lens according to claim 1, wherein the first lens group consists of, in order from the object side to the image side, one negative lens and two positive lenses, and assuming that an average value of Abbe numbers of the two positive lenses of the first lens group based on a d line is v1pave, Conditional Expression (11) is satisfied, which is represented by $$60 < v1pave < 97 \qquad (11).$$

13. The zoom lens according to claim 1, wherein the third lens group consists of, in order from the object side to the image side, one single lens having a positive refractive power, and a cemented lens in which one negative lens and one positive lens are cemented in order from the object side.

14. The zoom lens according to claim 1, wherein the fourth lens group includes a cemented lens in which one negative lens and one positive lens are cemented in order from the object side.

15. The zoom lens according to claim 1, wherein the sixth lens group consists of a single lens having a positive refractive power.

16. The zoom lens according to claim 1, wherein during zooming from the wide angle end to the telephoto end, the first lens group, the second lens group, the third lens group, the fourth lens group, and the fifth lens group move along the optical axis, and the sixth lens group remains stationary with respect to an image plane.

17. An imaging apparatus comprising the zoom lens according to claim 1.

18. A zoom lens consisting of, in order from an object side to an image side: a first lens group having a positive refractive power; a second lens group having a negative refractive power; a third lens group having a positive refractive power; a fourth lens group having a positive refractive power; a fifth lens group having a negative refractive power; and a sixth lens group having a positive refractive power, wherein during zooming from a wide angle end to a telephoto end, the third lens group and the fifth lens group move integrally along an optical axis and distances between adjacent lens groups in an optical axis direction change, and the fifth lens group consists of two negative lenses and one positive lens.

19. A zoom lens consisting of, in order from an object side to an image side: a first lens group having a positive refractive power; a second lens group having a negative refractive power; a third lens group having a positive refractive power; a fourth lens group having a positive refractive power; a fifth lens group having a negative refractive power; and a sixth lens group having a positive refractive power, wherein during zooming from a wide angle end to a telephoto end, the third lens group and the fifth lens group move integrally along an optical axis and distances between adjacent lens groups in an optical axis direction change, and all lens surfaces of the sixth lens group have a shape convex toward the image side.

* * * * *